(12) United States Patent
Cutter et al.

(10) Patent No.: US 10,033,404 B2
(45) Date of Patent: Jul. 24, 2018

(54) TECHNOLOGIES FOR EFFICIENTLY COMPRESSING DATA WITH RUN DETECTION

(71) Applicant: Intel Corporation, Santa Clara, CA (US)

(72) Inventors: Daniel F. Cutter, Maynard, MA (US); Vinodh Gopal, Westborough, MA (US); James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/639,289

(22) Filed: Jun. 30, 2017

(65) Prior Publication Data

US 2018/0026653 A1    Jan. 25, 2018

Related U.S. Application Data

(60) Provisional application No. 62/365,969, filed on Jul. 22, 2016, provisional application No. 62/376,859, filed on Aug. 18, 2016, provisional application No. 62/427,268, filed on Nov. 29, 2016.

(51) Int. Cl.
*H03M 7/38* (2006.01)
*H03M 7/30* (2006.01)

(52) U.S. Cl.
CPC ................ *H03M 7/3084* (2013.01)

(58) Field of Classification Search
CPC ........ H03M 7/3084; H03M 7/30; H03M 7/00; H03M 5/00; H03M 7/42

USPC ............................................. 341/50, 51, 106
See application file for complete search history.

(56) References Cited

U.S. PATENT DOCUMENTS

| | | | | |
|---|---|---|---|---|
| 5,051,745 | A | * | 9/1991 | Katz ................... H03M 7/3086 341/106 |
| 6,738,779 | B1 | * | 5/2004 | Shapira ............. G06F 17/30949 707/747 |
| 7,982,636 | B2 | * | 7/2011 | Abali .................. H03M 7/3088 341/51 |

(Continued)

OTHER PUBLICATIONS

David A. Huffman, "A Method for the Construction of Minimum-Redundancy Codes", Proceedings of the I.R.E., Sep. 1952, pp. 1098-1011.

(Continued)

*Primary Examiner* — Jean B Jeanglaude
(74) *Attorney, Agent, or Firm* — Barnes & Thornburg LLP

(57) ABSTRACT

Technologies for efficiently compressing data with run detection include a compute device. The compute device is to produce a hash as a function of a symbol at a present position and a predefined number of symbols after the present position in an input stream, determine whether the symbol at the present position is part of a run, obtain, from a hash table, a chain of pointers to previous positions in the input stream associated with the hash, determine, as a function of whether the symbol is part of a run and to identify a matched string, a number of strings referenced by the chain of pointers to compare to a string associated with the present position in the input stream, and output, in response to an identification of a matched string, a reference to the matched string in a set of compressed output data.

25 Claims, 20 Drawing Sheets

(56) References Cited

U.S. PATENT DOCUMENTS 8,791,843 B2 * 7/2014 Cohen ................ H03M 7/3084
　　　　　　　　　　　　　　　　　　341/51

OTHER PUBLICATIONS

"RFC 1951—Deflate Compressed Data Format Specification version", downloaded from http://www.faqs.org/rfcs/rfc1951.html, RFC 1951, 15 pages.
Ziv et al., "A Universal Algorithm for Sequential Data Compression", IEEE Transactions on Infoirmation Theory, col. IT-23, No. 3, May 1977, pp. 337-343.

* cited by examiner

| Table | 383 | 382 | 369 | 368 | 360 | 359 | 358 | 348 | 347 | 24 | 23 | 0 |
|---|---|---|---|---|---|---|---|---|---|---|---|---|
| Hash Table | Valid | | Unused | | Spill Count | Spill valid | | Spill Table Pointer | | Pointers (1-19) | | Pointer 0 |

| Table | 383 | 382 | 371 | 370 | 360 | 359 | 358 | 348 | 347 | 24 | 23 | 0 |
|---|---|---|---|---|---|---|---|---|---|---|---|---|
| Spill Table | Valid | | Unused | | Hash Table Index | Spill valid | | Spill Table Pointer | | Pointers (1-19) | | Pointer 0 |

TECHNOLOGIES FOR EFFICIENTLY COMPRESSING DATA WITH RUN DETECTION

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

Compression schemes, such as Lempel-Ziv based compression schemes (for example, LZ77 and LZ78) are often used in a data centers to compress data, thereby enabling compute devices in the data center to store more customer data in a given amount of data storage capacity and/or transmit more customer data in a given amount of network bandwidth. When compressing data pursuant to a Lempel-Ziv based scheme, the compute device searches for the longest string from a history buffer (e.g., a sliding window of previous data from an input stream) that matches a string starting at the present position in the input stream (e.g., a number of bytes into the input stream). To do so, the compute device typically produces a hash by performing a hashing function on a symbol (e.g., a byte or other unit of data) at the present position and one or more subsequent symbols in the input stream, and uses the resulting hash as an index into a hash table that includes, for each hash, a set of pointers that point to other strings in the history buffer that produced the same hash.

The compute device, in typical compression systems, then compares one or more of the strings associated with the pointers found in the hash table to the string at the present position to find one or more matches, and selects the longest matching string. To increase the level of compression, the compute device may compare a larger number of the possible matching strings to the present string, to increase the possibility of finding a longer matching string. When a suitable (e.g., long enough to satisfy a predefined threshold) matching string is found, the compute device replaces the literal symbols (e.g., the actual data) of the string starting at the present position with a much smaller (e.g., in terms of data size) reference back to the matched string, along with a length identifier, representing the amount of the matched string to reproduce at the present position. While increasing the number of strings to be compared against the string starting at the present position in an input stream may increase the compression of the data, it also increases the amount of time required to compress the input data.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 19 is a block diagram of an example hash table entry that may be utilized by a managed node of FIGS. 12 and 13;

FIG. 20 is a block diagram of an example spill table entry that may be utilized by a managed node of FIGS. 12 and 13.

DETAILED DESCRIPTION OF THE DRAWINGS

Figure 1:
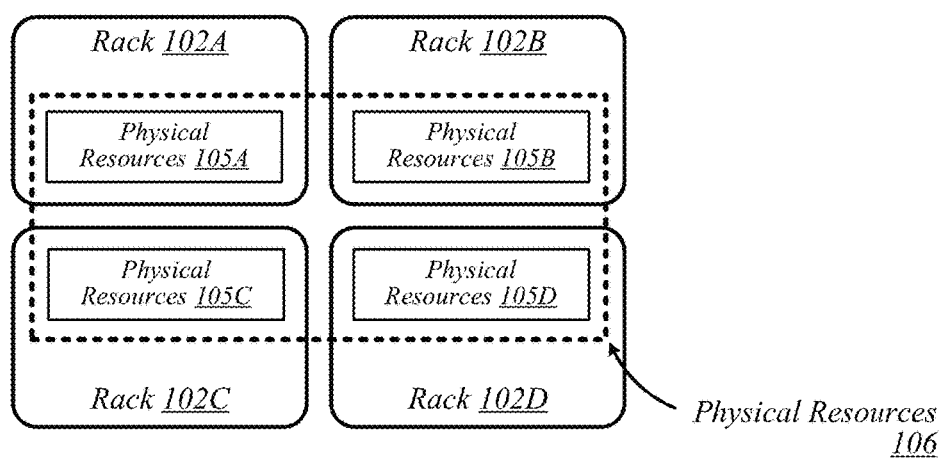
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual in-line memory modules (DIMMs), are located on a bottom side of the sled. In the present description, near memory may be embodied as any memory, such as volatile memory, coupled to the host central processing unit via a high bandwidth, low latency connection for efficient processing while far memory may be embodied as any memory, such as volatile or nonvolatile memory storage, that is larger and slower than the near memory, and is typically coupled to the central processing unit via a comparatively lower bandwidth and/or higher latency connection. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low-latency interconnections and network architecture, the data center 100 may, in use, pool resources, such as memory, accelerators (e.g., graphics accelerators, FPGAs, application specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
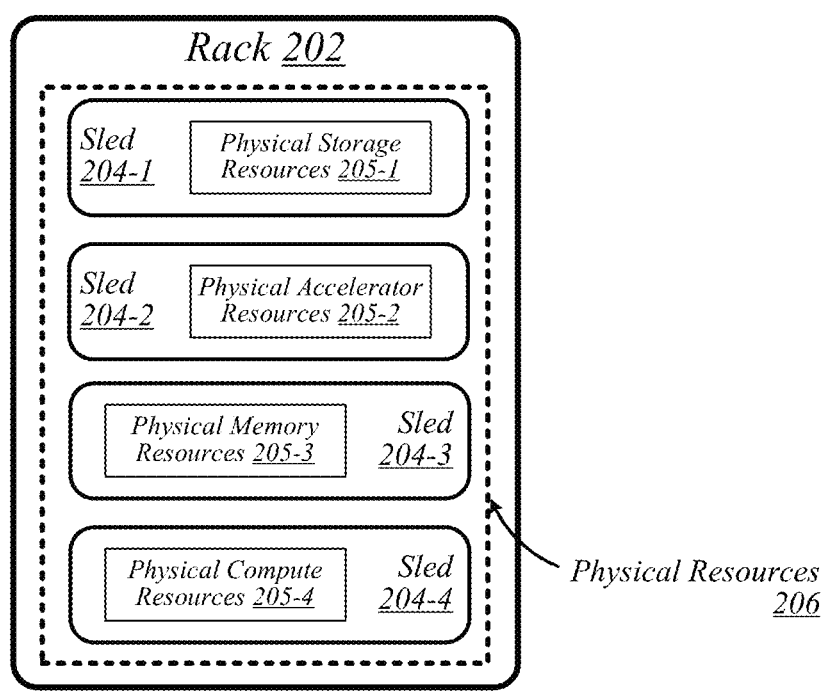
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
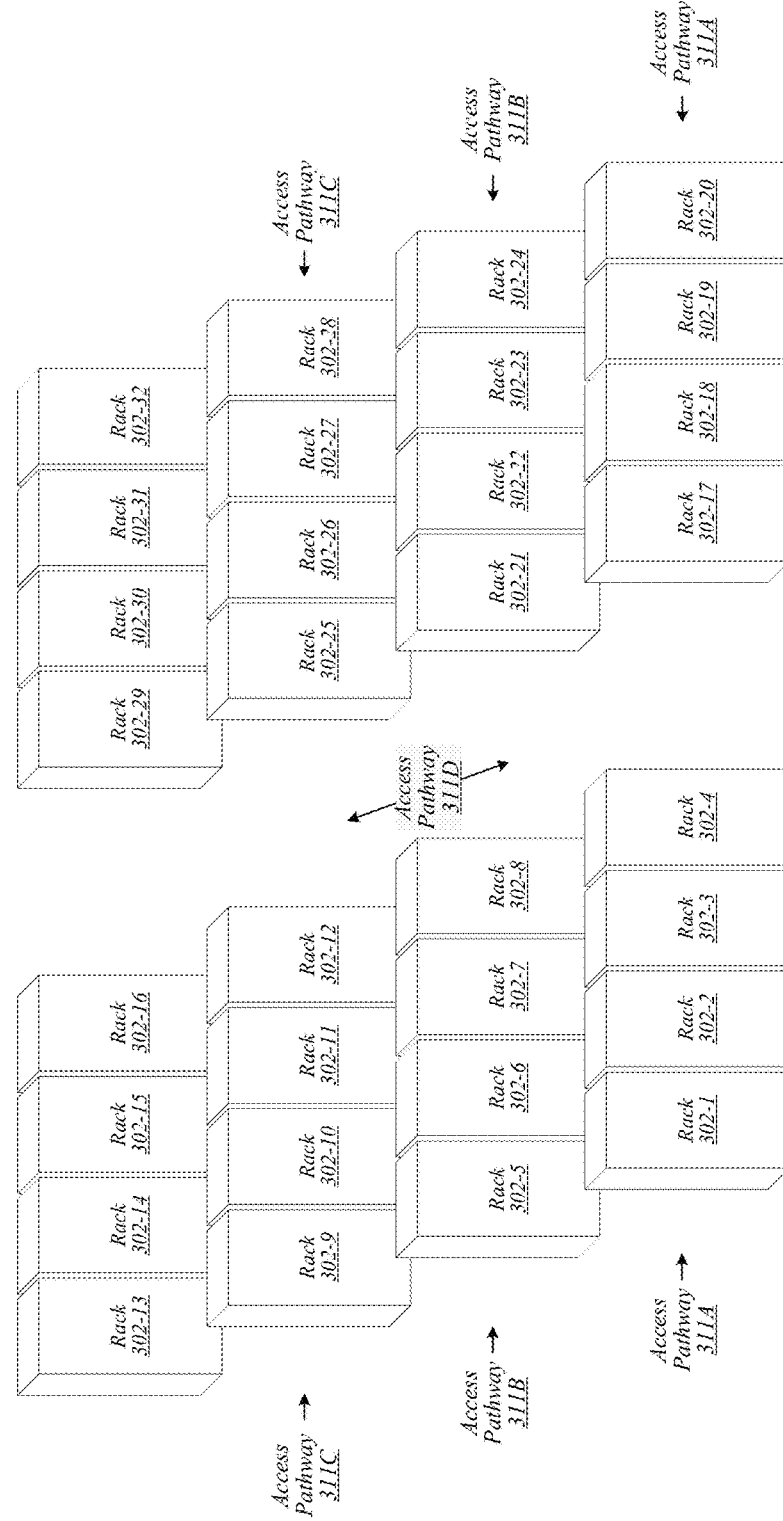
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
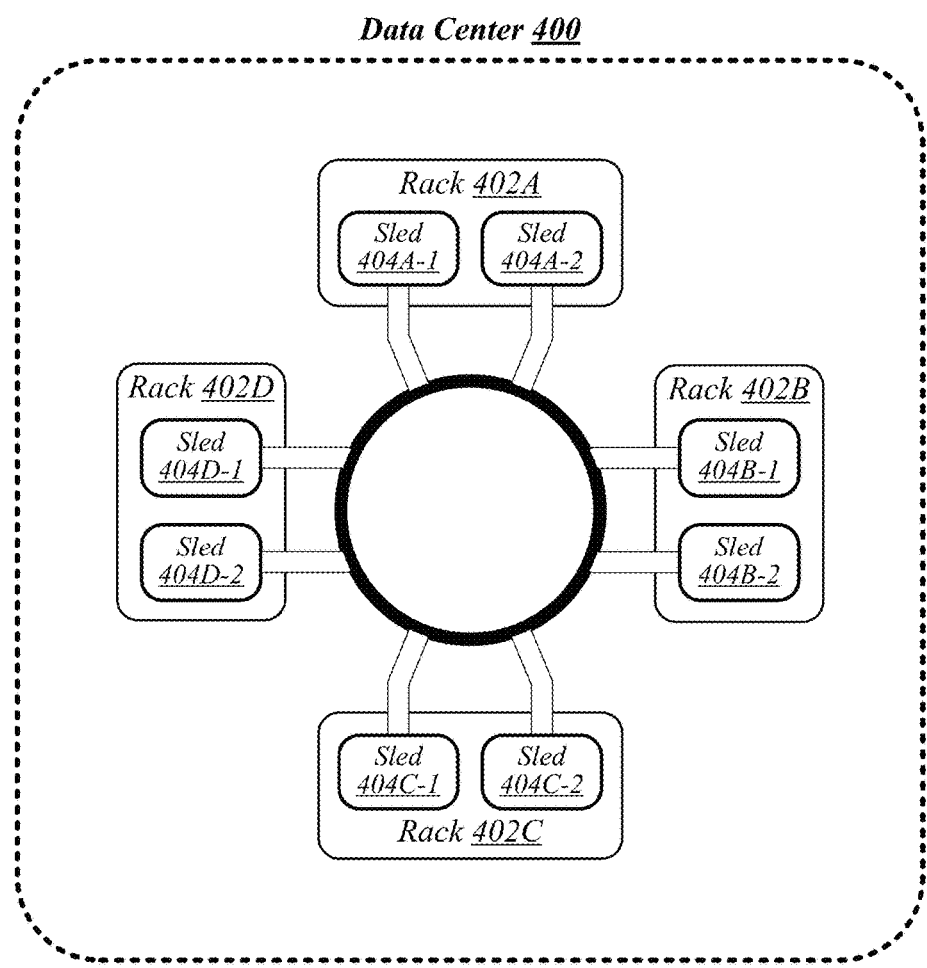
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
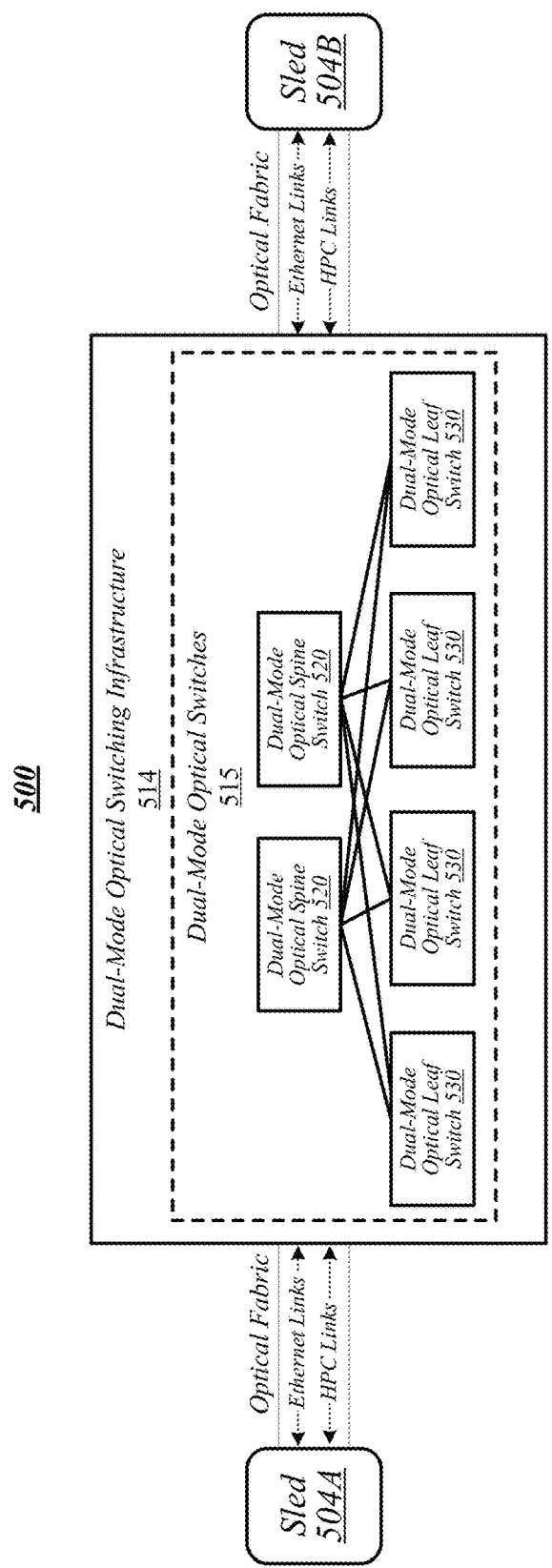
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
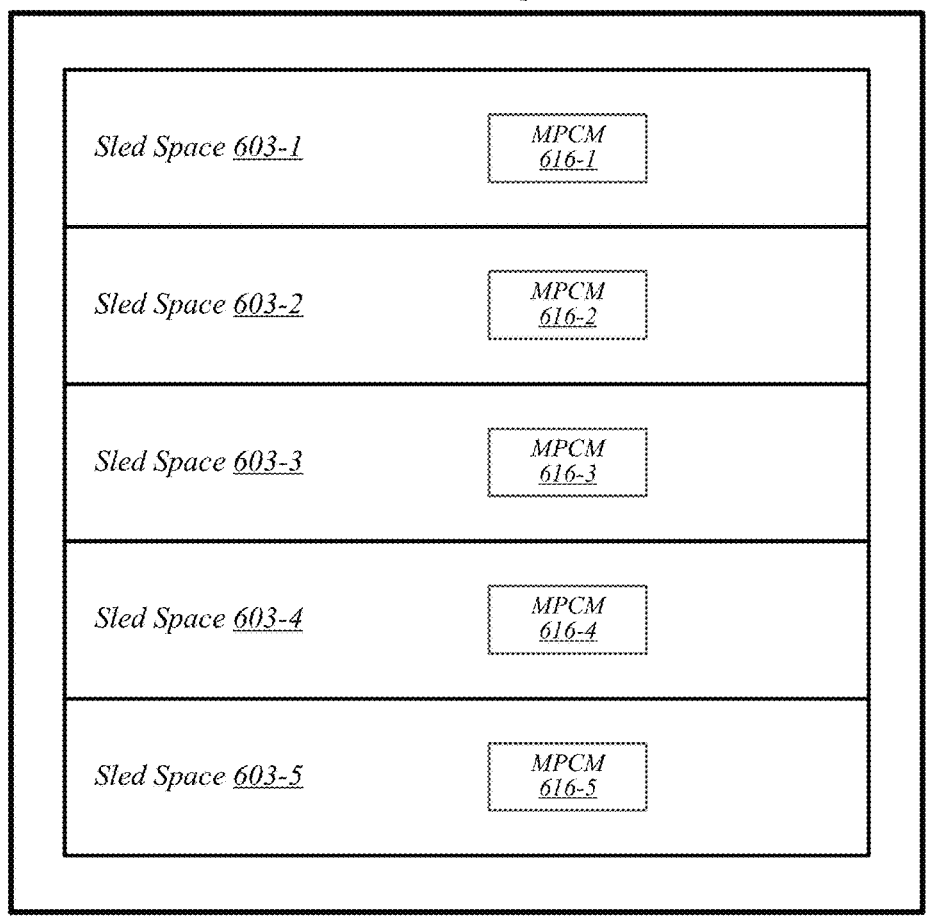
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
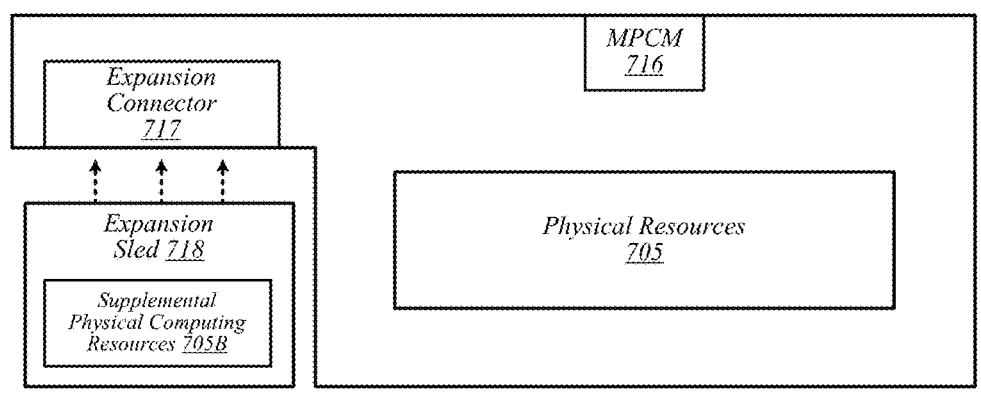
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
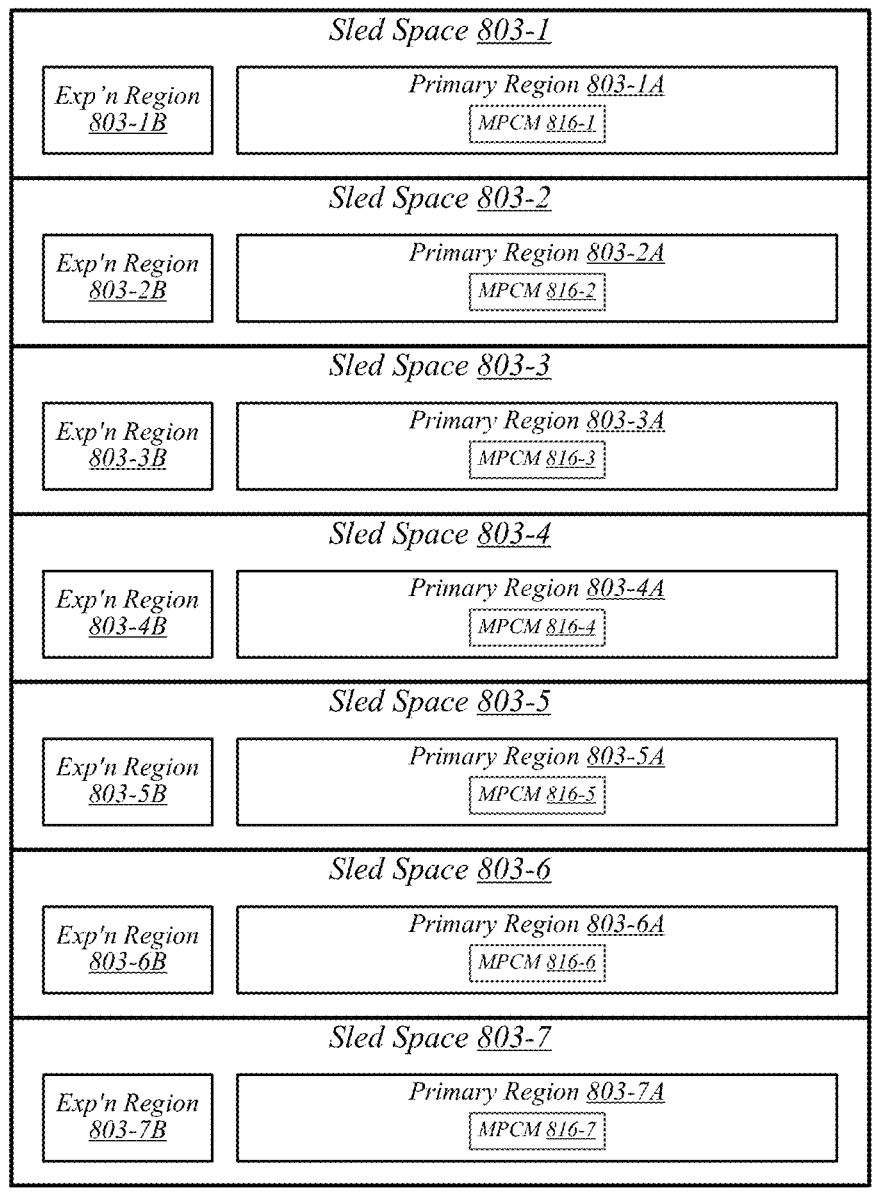
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
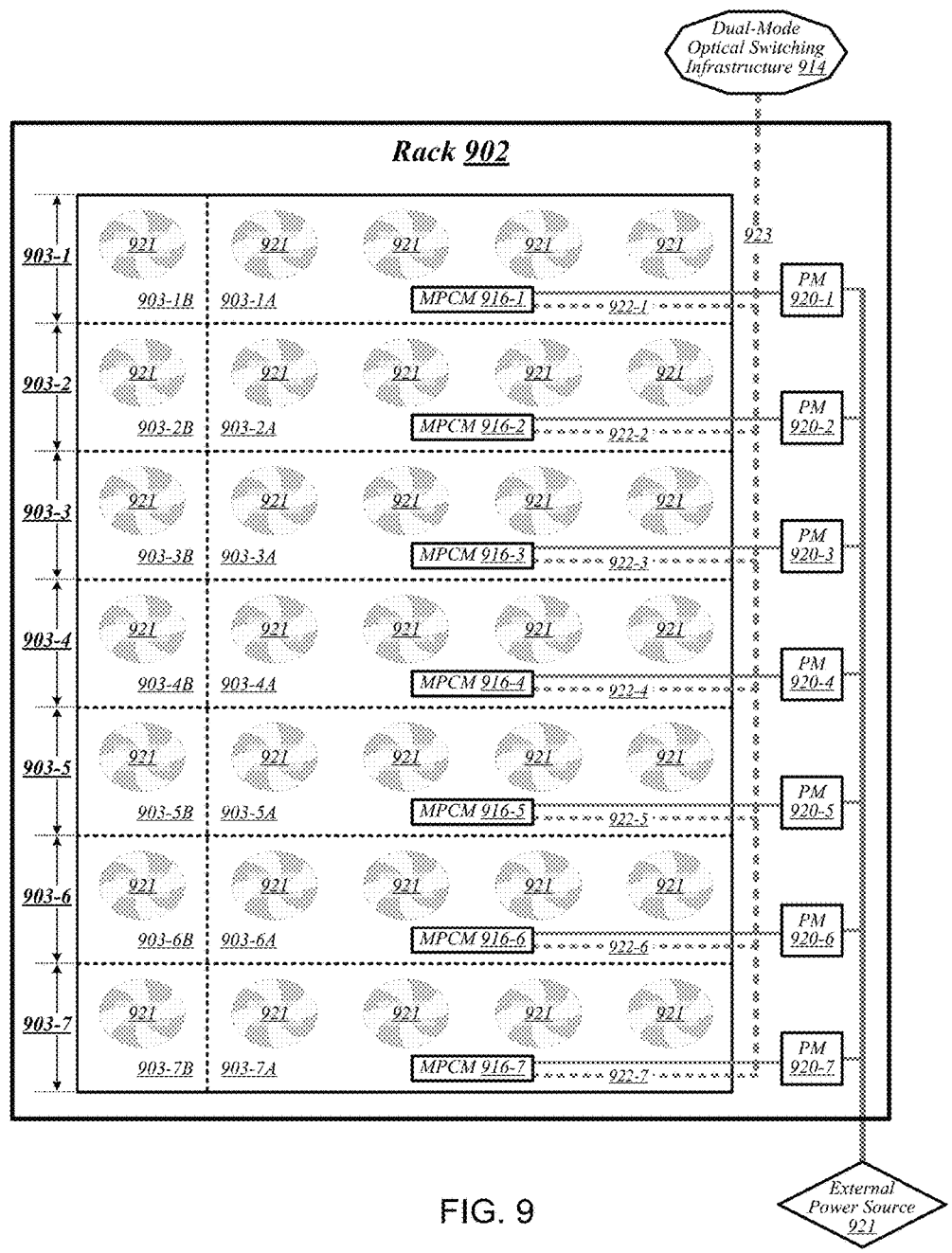
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
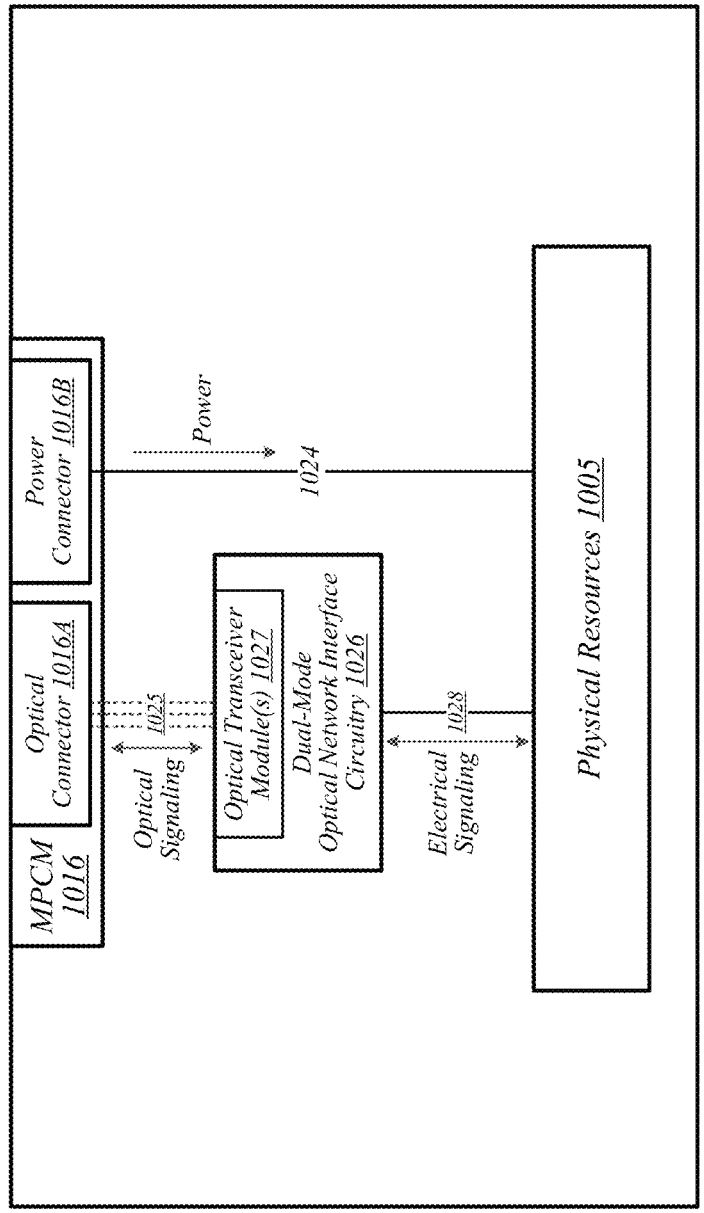
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
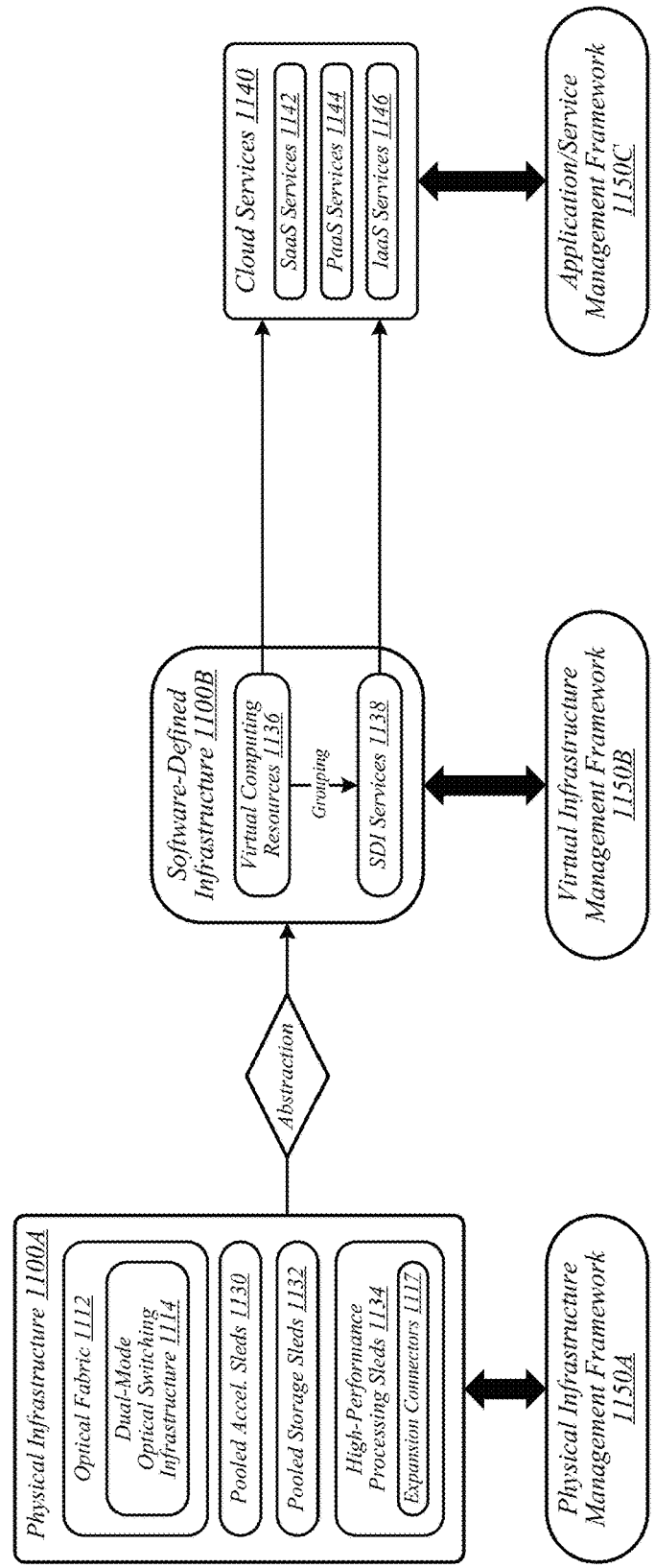
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs) (e.g., a controller coupled to a non-volatile memory chip, such as NAND, and an interface to a host device). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a memory expansion sled, such that the memory that is locally available to that high-performance processing sled 1134 is disaggregated from the processors and memory comprised on that sled. In some embodiments, such a high-performance processing sled 1134 may be configured with memory using an expansion sled that comprises a low-latency SSD. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of software-defined infrastructure (SDI) services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
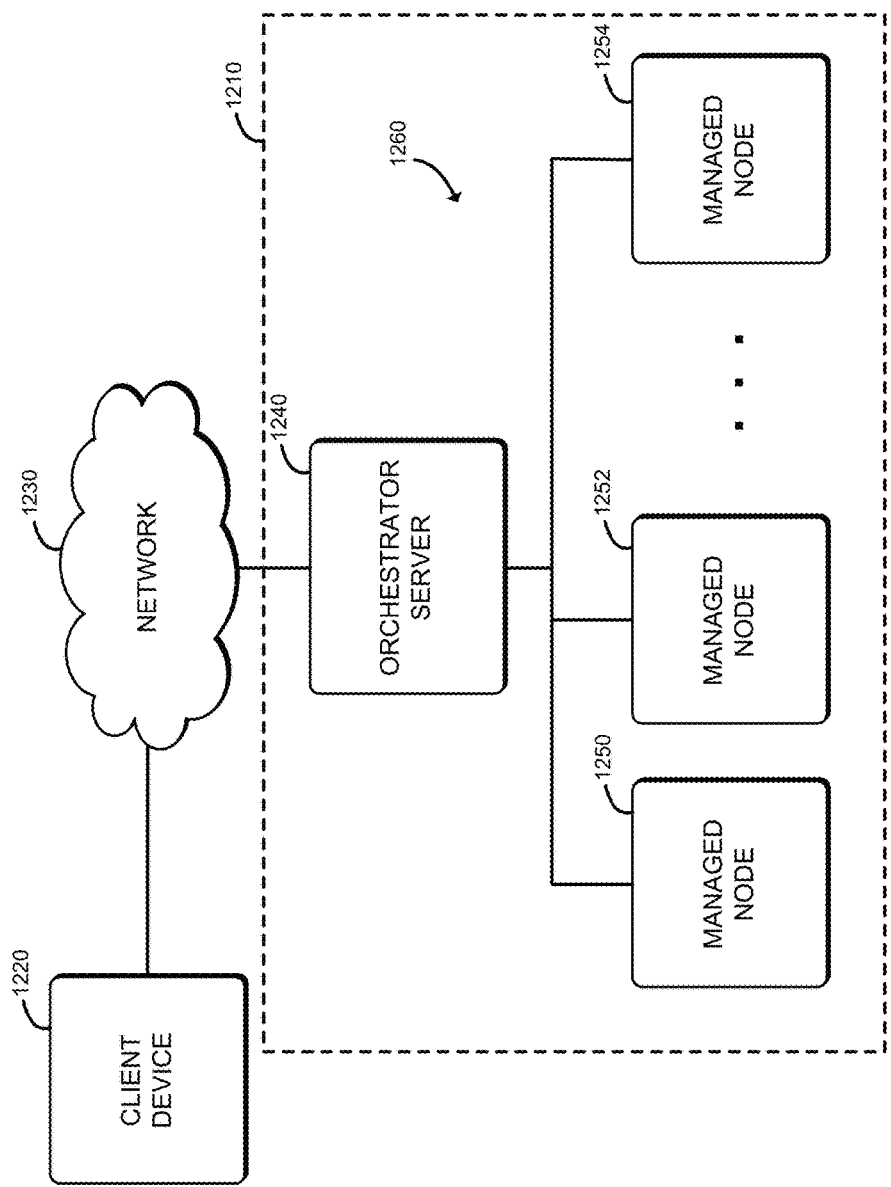
FIG. 12 is a simplified block diagram of at least one embodiment of a system for efficiently compressing data with run detection.

As shown in FIG. 12, an illustrative system 1210 may be implemented in accordance with the data centers 100, 300, 400, 1100 described above with reference to FIGS. 1, 3, 4, and 11 and provide storage and compute services (e.g., cloud services) to a client device 1220 that is in communication with the system 1210 through a network 1230. In the illustrative embodiment, the system 1210, in operation, performs efficient compression of data using run detection. The illustrative system 1210 includes a set of managed nodes 1260 in communication with each other and with an orchestrator server 1240. Each managed node 1260 may be embodied as an assembly of resources (e.g., physical resources 206), such as compute resources (e.g., physical compute resources 205-4), storage resources (e.g., physical storage resources 205-1), accelerator resources (e.g., physical accelerator resources 205-2), or other resources (e.g., physical memory resources 205-3) from the same or different sleds (e.g., the sleds 204-1, 204-2, 204-3, 204-4, etc.) or racks (e.g., one or more of racks 302-1 through 302-32). Further, each managed node 1260 may be established, defined, or "spun up" by the orchestrator server 1240 at the time a workload is to be assigned to the managed node 1260 or at any other time, and may exist regardless of whether any workloads are presently assigned to the managed node 1260. In the illustrative embodiment, the set of managed nodes 1260 includes managed nodes 1250, 1252, and 1254. While three managed nodes 1260 are shown in the set, it should be understood that in other embodiments, the set may include a different number of managed nodes 1260 (e.g., tens of thousands). The orchestrator server 1240 may support a cloud operating environment, such as OpenStack, and assign workloads to the managed nodes 1260 for execution.

The managed nodes 1260 may execute the workloads, such as in virtual machines or containers, on behalf of a user of the client device 1220. Managed nodes 1260 executing respective workloads may issue separate requests to read data and/or write data from or to one or other resources available in the system 1210 (e.g., physical storage resources 205-1, one or more physical memory resources 205-3, etc.). To reduce the amount of data transmitted between the resources in the system 1210, the data may be compressed (e.g., by a resource of a managed node 1260) prior to transmission, and decompressed (e.g., by another resource of a managed node 1260) after receipt of the data.

In the illustrative embodiment, in operation, a managed node 1260 may compress an input stream (e.g., an input file) using an Lempel-Ziv based compression scheme that is modified to detect runs, which, in the illustrative embodiment, are strings that are made of contiguous repetitions of one or more symbols (e.g., the symbol "A" or a pattern of symbols, such as "AB"). The managed node 1260 may do so by comparing the symbol at the present position (the "present symbol") in the input stream to a predefined number of symbols following the present symbol in the input stream and determining whether there is a repetition of the present symbol or a set of symbols that the present symbol is included in (e.g., "AAAAAAA", "ABABABAB", etc.). Typically, when the present symbol is included in a run, the first pointer (e.g., the position of the most recently found string that resulted in the same hash as a hash produced from the present symbol and one or more subsequent symbols) in the hash table points to an earlier detected occurrence of a string that contains the repeating symbol(s) (e.g., the run). As such, rather than comparing the string at the present position to a relatively high number of strings referenced by pointers associated with the generated hash, the managed node 1260 determines to compare the string at the present position to only a small number (e.g., one) string referenced in the entry associated with the produced hash. As such, the managed node 1260 may achieve a high level of compression without incurring the usual computation time involved in comparing the string at the present position to many other strings that produced the same hash.

Figure 13:
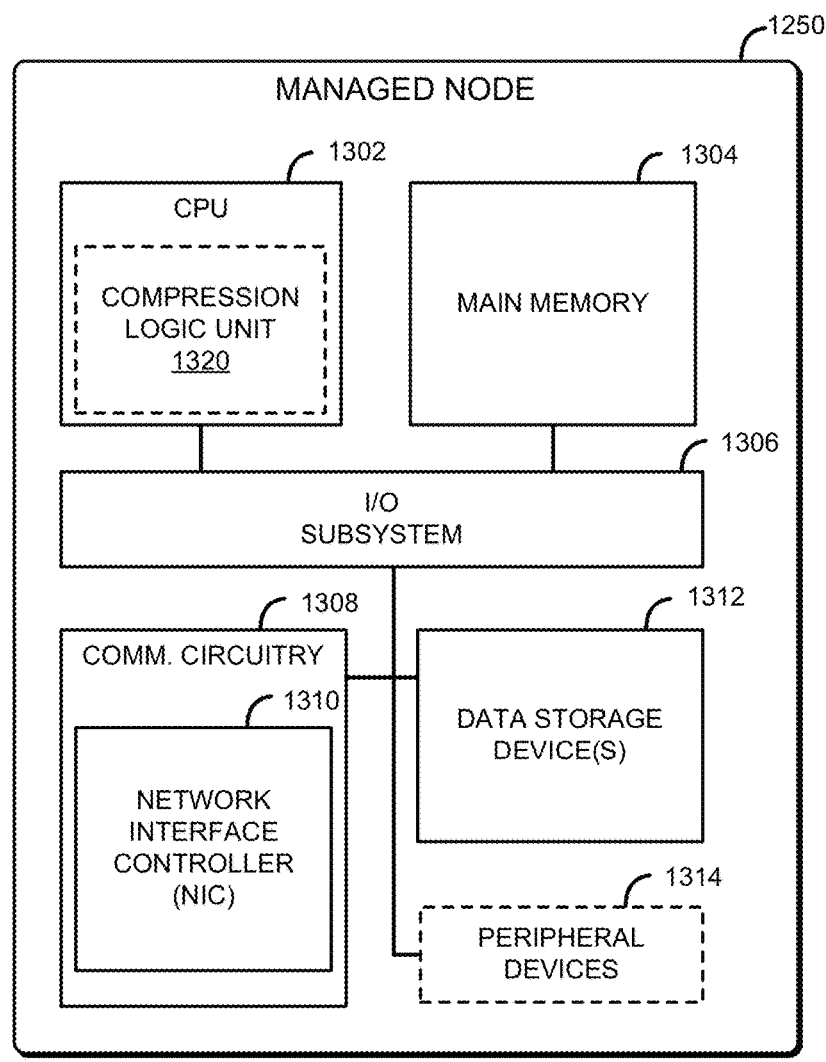
FIG. 13 is a simplified block diagram of at least one embodiment of a managed node of the system of FIG. 12.

Referring now to FIG. 13, the managed node 1250 in the set of managed nodes 1260 may be embodied as any type of compute device capable of performing the functions described herein, including decompressing data, compressing data, reading data, writing data, transmitting data, and performing workloads. For example, the managed node 1250 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 13, the illustrative managed node 1250 includes a central processing unit (CPU) 1302, a main memory 1304, an input/output (I/O) subsystem 1306, communication circuitry 1308, and one or more data storage devices 1312. Of course, in other embodiments, the managed node 1250 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1304, or portions thereof, may be incorporated in the CPU 1302.

The CPU 1302 may be embodied as any type of processor capable of performing the functions described herein. As such, the CPU 1302 may be embodied as a single or multi-core processor(s), a microcontroller, or other processor or processing/controlling circuit. In some embodiments, the CPU 1302 may be embodied as, include, or be coupled to a field programmable gate array (FPGA), an application specific integrated circuit (ASIC), reconfigurable hardware or hardware circuitry, or other specialized hardware to facilitate performance of the functions described herein. In the illustrative embodiment, the CPU 1302 may include specialized compression logic 1320, which may be embodied as any circuitry or device, such as an FPGA, an ASIC, or co-processor, capable of offloading, from the other components of the CPU 1302, the compression of data using run detection. As discussed above, the managed node 1250 may include resources distributed across multiple sleds and in such embodiments, the CPU 1302 may include portions thereof located on the same sled or different sled.

The main memory 1304 may be embodied as any type of volatile (e.g., dynamic random access memory (DRAM), etc.) or non-volatile memory or data storage capable of performing the functions described herein. In some embodiments, all or a portion of the main memory 1304 may be integrated into the CPU 1302. In operation, the main memory 1304 may store various software and data used during operation, such as uncompressed input data, hash table data, spill table data, run detection data, compressed output data, operating systems, applications, programs, libraries, and drivers. The managed node 1250 may include resources distributed across multiple sleds and in such embodiments, the main memory 1304 may include portions thereof located on the same sled or different sled.

The I/O subsystem 1306 may be embodied as circuitry and/or components to facilitate input/output operations with the CPU 1302, the main memory 1304, and other components of the managed node 1250. For example, the I/O subsystem 1306 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1306 may form a portion of a system-on-a-chip (SoC) and be incorporated, along with one or more of the CPU 1302, the main memory 1304, and other components of the managed node 1250, on a single integrated circuit chip.

The communication circuitry 1308 may be embodied as any communication circuit, device, or collection thereof, capable of enabling communications over the network 1230 between the managed node 1250 and another compute device (e.g., the orchestrator server 1240 and/or one or more other managed nodes 1260). The communication circuitry 1308 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1308 includes a network interface controller (NIC) 1310, which may also be referred to as a host fabric interface (HFI). The NIC 1310 may be embodied as one or more add-in-boards, daughtercards, network interface cards, controller chips, chipsets, or other devices that may be used by the managed node 1250 to connect with another compute device (e.g., the orchestrator server 1240 and/or physical resources of one or more managed nodes 1260). In some embodiments, the NIC 1310 may be embodied as part of a system-on-a-chip (SoC) that includes one or more processors, or included on a multichip package that also contains one or more processors. In some embodiments, the NIC 1310 may include a processor (not shown) local to the NIC 1310. In such embodiments, the local processor of the NIC 1310 may be capable of performing one or more of the functions of the CPU 1302 described herein. As discussed above, the managed node 1250 may include resources distributed across multiple sleds and in such embodiments, the communication circuitry 1308 may include portions thereof located on the same sled or different sled.

The one or more illustrative data storage devices 1312, may be embodied as any type of devices configured for short-term or long-term storage of data such as, for example, solid-state drives (SSDs), hard disk drives, memory cards, and/or other memory devices and circuits. Each data storage device 1312 may include a system partition that stores data and firmware code for the data storage device 1312. Each data storage device 1312 may also include an operating system partition that stores data files and executables for an operating system. In the illustrative embodiment, each data storage device 1312 includes non-volatile memory. Non-volatile memory may be embodied as any type of data storage capable of storing data in a persistent manner (even if power is interrupted to the non-volatile memory). For example, in the illustrative embodiment, the non-volatile memory is embodied as Flash memory (e.g., NAND memory or NOR memory). In other embodiments, the non-volatile memory may be embodied as any combination of memory devices that use chalcogenide phase change material (e.g., chalcogenide glass), or other types of byte-addressable, write-in-place non-volatile memory, ferroelectric transistor random-access memory (FeTRAM), nanowire-based non-volatile memory, phase change memory (PCM), memory that incorporates memristor technology, magnetoresistive random-access memory (MRAM) or Spin Transfer Torque (STT)-MRAM, multi-threshold level NAND memory, a resistive memory, anti-ferroelectric memory, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

Additionally, the managed node 1250 may include one or more peripheral devices 1314. Such peripheral devices 1314 may include any type of peripheral device commonly found in a compute device such as a display, speakers, a mouse, a keyboard, and/or other input/output devices, interface devices, and/or other peripheral devices.

The client device 1220, the orchestrator server 1240, and the other managed nodes 1260 may have components similar to those described in FIG. 13. The description of those components of the managed node 1250 is equally applicable to the description of components of the client device 1220, the orchestrator server 1240, and the other managed nodes 1260 and is not repeated herein for clarity of the description. Further, it should be appreciated that any of the client device 1220, the orchestrator server 1240, and the other managed nodes 1260 may include other components, sub-components, and devices commonly found in a computing device, which are not discussed above in reference to the managed node 1250 and not discussed herein for clarity of the description.

As described above, the client device 1220, the orchestrator server 1240 and the managed nodes 1260 are illustratively in communication via the network 1230, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (Wi-MAX), etc.), digital subscriber line (DSL) networks, cable networks (e.g., coaxial networks, fiber networks, etc.), or any combination thereof.

Figure 14:
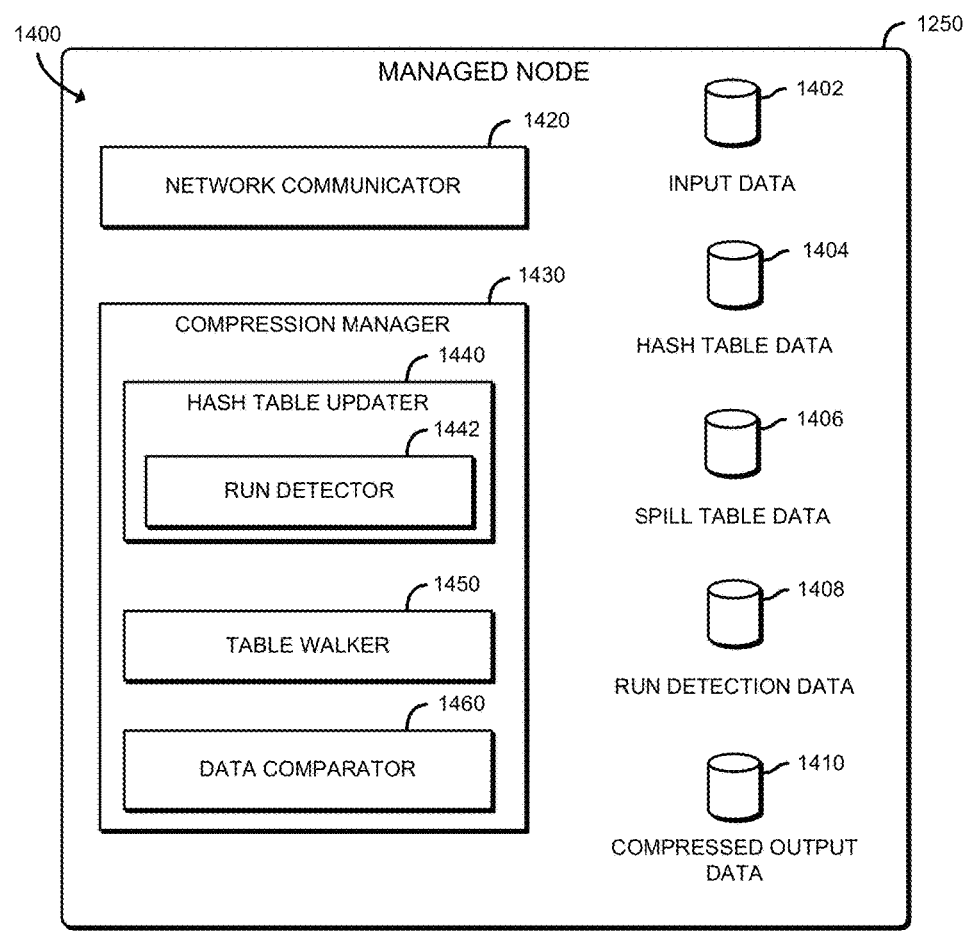
FIG. 14 is a simplified block diagram of at least one embodiment of an environment that may be established by a managed node of FIGS. 12 and 13.

Referring now to FIG. 14, in the illustrative embodiment, the managed node 1250 may establish an environment 1400 during operation. The illustrative environment 1400 includes a network communicator 1420 and a compression manager 1430. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, compression manager circuitry 1430, etc.). It should be appreciated that, in such embodiments, one or more of the network communicator circuitry 1420 or the compression manager circuitry 1430 may form a portion of one or more of the CPU 1302 the compression logic unit 1320, the communication circuitry 1308, the main memory 1304, the I/O subsystem 1306, and/or other components of the managed node 1250. In the illustrative embodiment, the environment 1400 includes input data 1402 which may be embodied as any data, such as an input stream (e.g., an input file), that has not yet been compressed pursuant to the run detection compression scheme described herein. The data may have been received from another device (e.g., the client device 1220, the orchestrator server 1240, one or more resources of another managed node 1260) or generated by the present managed node 1260. As described herein, each unit of data in the input data 1402 is referred to as a symbol for the purposes of the run detection compression scheme. Each symbol may be embodied as a byte or another quantity of bits, depending on the particular embodiment. However, in the illustrative embodiment, each symbol is embodied as a byte. A sequence of symbols is referred to as a string and a repeating sequence of the same symbol (e.g., "AAAAAA") or of a set of multiple different symbols (e.g. "ABABA-BAB") is referred to herein as a run. The environment 1400, in the illustrative embodiment, additionally includes hash table data 1404 which may be embodied as any data indicative of a structure in which hashes produced from a set of symbols (e.g., the first four symbols) of a string in the input data 1402 are associated with pointers (e.g., locations) of the beginnings of the strings in the input data 1402. Each hash is smaller in size (e.g., in the number of bits) than the combined sizes (e.g., total number of bits) of the symbols from which the hashes were produced. As such, hash collisions may occur, in which different strings of symbols may be referenced in connection with the same hash in the hash table data 1404. Additionally, the environment 1400 includes spill table data 1406, which may be embodied as any data indicative of pointers to strings that did not fit within a set amount of space available in the hash table. In the illustrative embodiment, for a given hash, twenty pointers to strings may be stored in the hash table data 1404, with the most recently produced pointer being in a first position and previously produced pointers occupying subsequent positions. Any additional pointers (e.g., those produced even earlier) are evicted to the spill table data 1406, as described herein. The illustrative environment 1400 additionally includes run detection data 1408, which may be embodied as any data indicative of whether each symbol in the input data 1402 is part of a run (e.g., a run status bit that may be set to one or zero). Additionally, the run detection data 1408, in the illustrative embodiment, may include a run table which may be embodied as any data structure that indicates the positions and lengths of different runs that the managed node 1250 has detected in the input data 1402. The illustrative environment 1400 additionally includes compressed output data 1410 which may be embodied as compressed form of the input data 1402, produced by the managed node 1250 as a result of performing the run detection compression scheme on the input data 1402.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the managed node 1250. To do so, the network communicator 1420 is configured to receive and process data packets from one system or computing device (e.g., the orchestrator server 1240, a managed node 1260, etc.) and to prepare and send data packets to another computing device or system (e.g., another managed node 1260). Accordingly, in some embodiments, at least a portion of the functionality of the network communicator 1420 may be performed by the communication circuitry 1308, and, in the illustrative embodiment, by the NIC 1310.

The compression manager 1430, which may be embodied as hardware, firmware, software, virtualized hardware, emulated architecture, and/or a combination thereof as discussed above, is configured to manage the compression of the input data 1402 to produce the compressed output data 1410 using run detection. To do so, in the illustrative embodiment, the compression manager 1430 includes a hash table updater 1440, a table walker 1450, and a data comparator 1460. The hash table updater 1440, in the illustrative embodiment, is configured to produce a hash by performing a hash function on the symbol at the present position in the input data 1402 and a predefined number of subsequent symbols (e.g., three subsequent symbols) in the input data 1402. Additionally, the hash table updater 1440 stores, in the hash table data 1404 and in association with the produced hash (e.g., using the produced hash as an index into the hash table data 1404), a pointer to the present location in the input data 1402. In doing so, the hash table updater 1440 stores the pointer at the first position and shifts any already-existing pointers for the same hash to subsequent positions (e.g., from the first position to the second position, from the second position to the third position, etc.). Further, the hash table updater 1440 may evict older pointers associated with the hash to the spill table data 1406 (e.g., if the total number of pointers associated with the hash exceeds a predefined threshold, such as 20). The hash table updater 1440, in the illustrative embodiment, includes a run detector 1442, which is configured to determine whether the symbol at the present position is part of a run. The hash table updater 1440 may do so by comparing the symbol at the present position to subsequent symbols in the input data 1402 and determining whether the present symbol is part of a string that repeats the symbol, or is part of a string that includes the present symbol along with one or more other symbols in a repeating pattern. In response to a determination that the present symbol is part of a run, the run detector 1442 sets a corresponding run status bit in the run detection data 1408 to a value that indicates that the present symbol is part of a run (e.g., by setting the run status bit to one). Otherwise, the run detector 1442 sets the run status bit to a value that indicates that the present symbol is not part of a run (e.g., by setting the run status bit to zero). As described above, each symbol in the input data 1402 has an associated run status bit assigned to it in the run detection data 1408. Additionally, the run detector 1442 may store a run table in the run detection data 1408 in which the run detector 1442 stores the starting positions and lengths of runs that the run detector 1442 has detected in the input data 1402. In doing so, the run detector 1442 may enforce a limit (e.g., four) on the number of references to a given run may be included in the run table, and evict older references to runs (e.g., references to positions earlier in the input data 1402) as the run detector 1442 adds new occurrences of the run to the run table.

The table walker 1450, in the illustrative embodiment, is configured to request the set of pointers for a given hash (e.g., for a hash corresponding to the symbol at the present position) from the hash table updater 1440 or directly from the hash table data 1404 and "walk" (e.g., traverse) the set of pointers, which may also be referred to herein as a "pointer chain" or a "hash chain", by obtaining the pointer in the first position for the hash, and passing the pointer to the data comparator 1460, which, in the illustrative embodiment, is configured to compare the string referenced by the pointer to the present symbol and any subsequent symbols to determine whether and how many consecutive symbols match. As described above, a set of consecutive symbols form a string, and a string of a repeating symbol or pattern of symbols forms a run. Additionally, the table walker 1450 sends up to a defined number of pointers to the data comparator 1460, and as such, may not send all of the pointers for a given hash to the data comparator 1460. In the illustrative embodiment, if the table walker 1450 determines that the symbol at the present position is part of a run (e.g., by checking whether the corresponding run status bit indicates that the present symbol is part of a run), the table walker 1450 sends a relatively small number of pointers to the data comparator 1460, and in the illustrative embodiment, only sends the first pointer (e.g., in the first position in the hash table data 1404 for the hash), as the first pointer is statistically likely to refer to a string (e.g., a run) that matches the present symbol. Otherwise, the table walker 1450 may send a relatively large number of pointers to the data comparator 1460 to improve the likelihood that the data comparator will find a relatively long matching string. The compression manager 1430 outputs a reference to the longest matching string found, in place of the symbol itself (referred to herein as "literal"), and then advances to a subsequent position in the input data 1402 to perform the above operations again.

It should be appreciated that each of the hash table updater 1440, the run detector 1442, the table walker 1450, and the data comparator 1460 may be separately embodied as hardware, firmware, software, virtualized hardware, emulated architecture, and/or a combination thereof and may be distributed across multiple sleds. For example, the hash table updater 1440 may be embodied as a hardware component, while the run detector 1442, the table walker 1450, and the data comparator 1460 are embodied as virtualized hardware components or as some other combination of hardware, firmware, software, virtualized hardware, emulated architecture, and/or a combination thereof.

Figure 15:
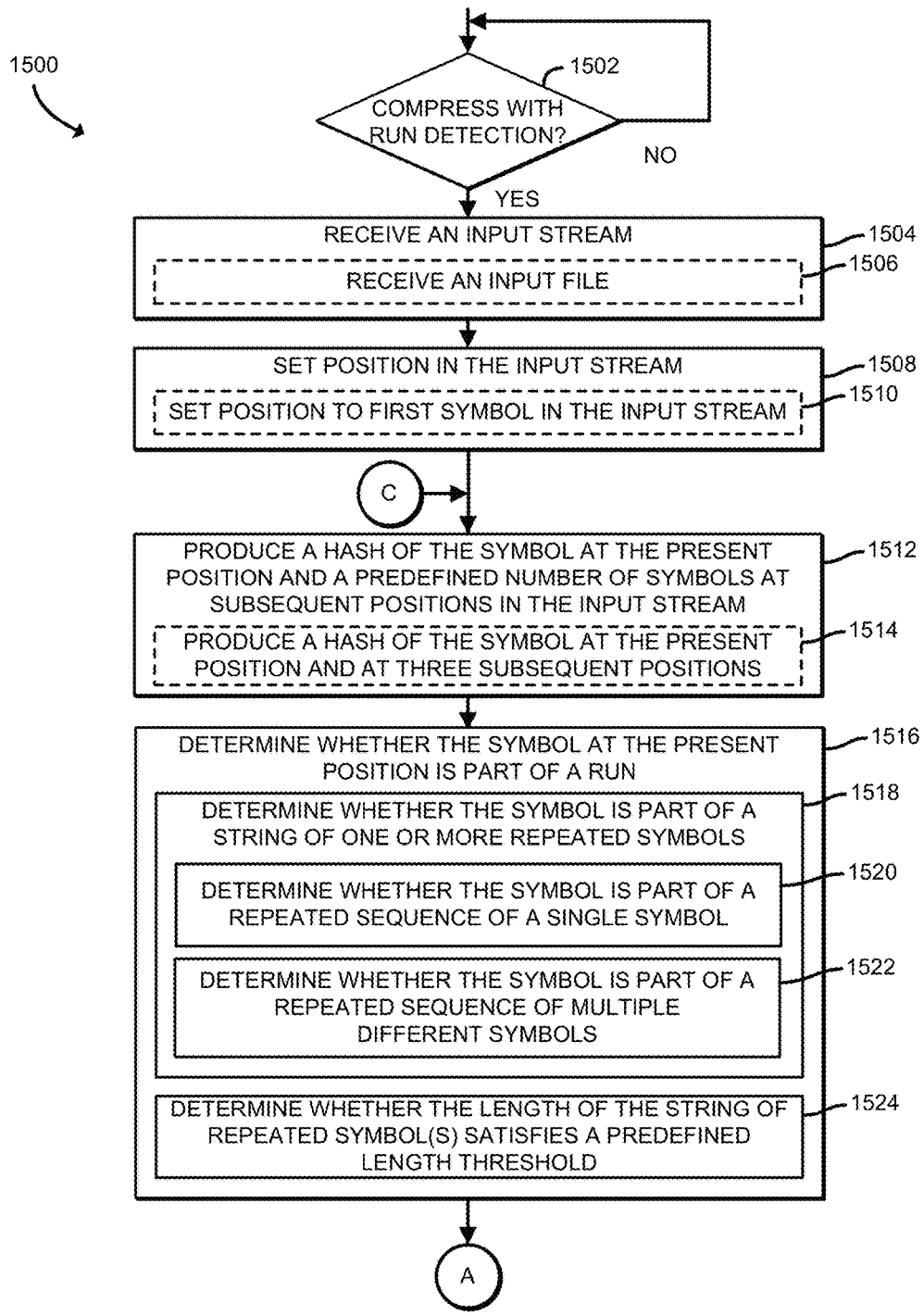
FIGS. 15-17 are a simplified flow diagram of at least one embodiment of a method for efficiently compressing data with run detection that may be performed by a managed node of FIGS. 12 and 13.

Referring now to FIG. 15, in use, the managed node 1250 may execute a method 1500 for efficiently compressing data using run detection. The method 1500 begins with block 1502, in which the managed node 1250 determines whether to compress data using run detection. In the illustrative embodiment, the managed node 1250 may determine to compress data using run detection if the managed node 1250 is powered on and has detected the presence of the compression logic unit 1320. In other embodiments, the managed node 1250 may determine to compress data using run detection based on other factors (e.g., if the managed node 1250 has been assigned a workload that includes compression tasks, etc.). Regardless, in response to a determination to compress data using run detection, the method 1500 advances to block 1504 in which the managed node 1250 receives an input stream (e.g., the input data 1402), such as from another resource of the managed node 1250 (e.g., from a physical compute resource 205-4, a physical storage resource 205-1) or from another compute device (e.g., the orchestrator server 1240, the client device 1220, etc.). The input stream may be embodied as an input file, as indicated in block 1506. Subsequently, the managed node 1250 sets a present position in the input stream (e.g., the input data 1402), as indicated in block 1508. In doing so, in the illustrative embodiment, the managed node 1250 sets the present position to the first symbol in the input stream, as indicated in block 1510.

Afterwards, in block 1512, the managed node 1250 produces a hash of the symbol at the present position along with a predefined number of symbols at subsequent positions in the input stream. In doing so, in the illustrative embodiment, the managed node 1250 produces a hash of the symbol at the present position and at three subsequent positions (e.g., the symbols at positions n, n+1, n+2, and n+3, wherein n is the present position), as indicated in block 1514. Subsequently, in block 1516, the managed node 1260 determines whether the symbol at the present position is part of a run. In doing so, the managed node 1250 determines whether the symbol at the present position is part of a string of one or more repeated symbols, such as by comparing the symbol at the present position to multiple subsequent symbols, as indicated in block 1518. In the illustrative embodiment, the managed node 1250 determines whether the symbol at the present position is part of a repeated sequence of a single symbol (e.g., a repetition of the present symbol, such as "AAAAAA"), as indicated in block 1520. Additionally or alternatively, the managed node 1250, in the illustrative embodiment, determines whether the symbol at the present position is part of a repeated sequence of multiple different symbols (e.g., "ABABABAB"), as indicated in block 1522. In determining whether the symbol at the present position is part of a run, the managed node 1250 may determine whether the length of the string of repeated symbols satisfies a predefined length threshold (e.g., at least two symbols long), as indicated in block 1524. Subsequently, the method 1500 advances to block 1526 of FIG. 16, in which the managed node 1250 determines the subsequent actions to perform based on whether the present symbol is part of a run.

Figure 16:
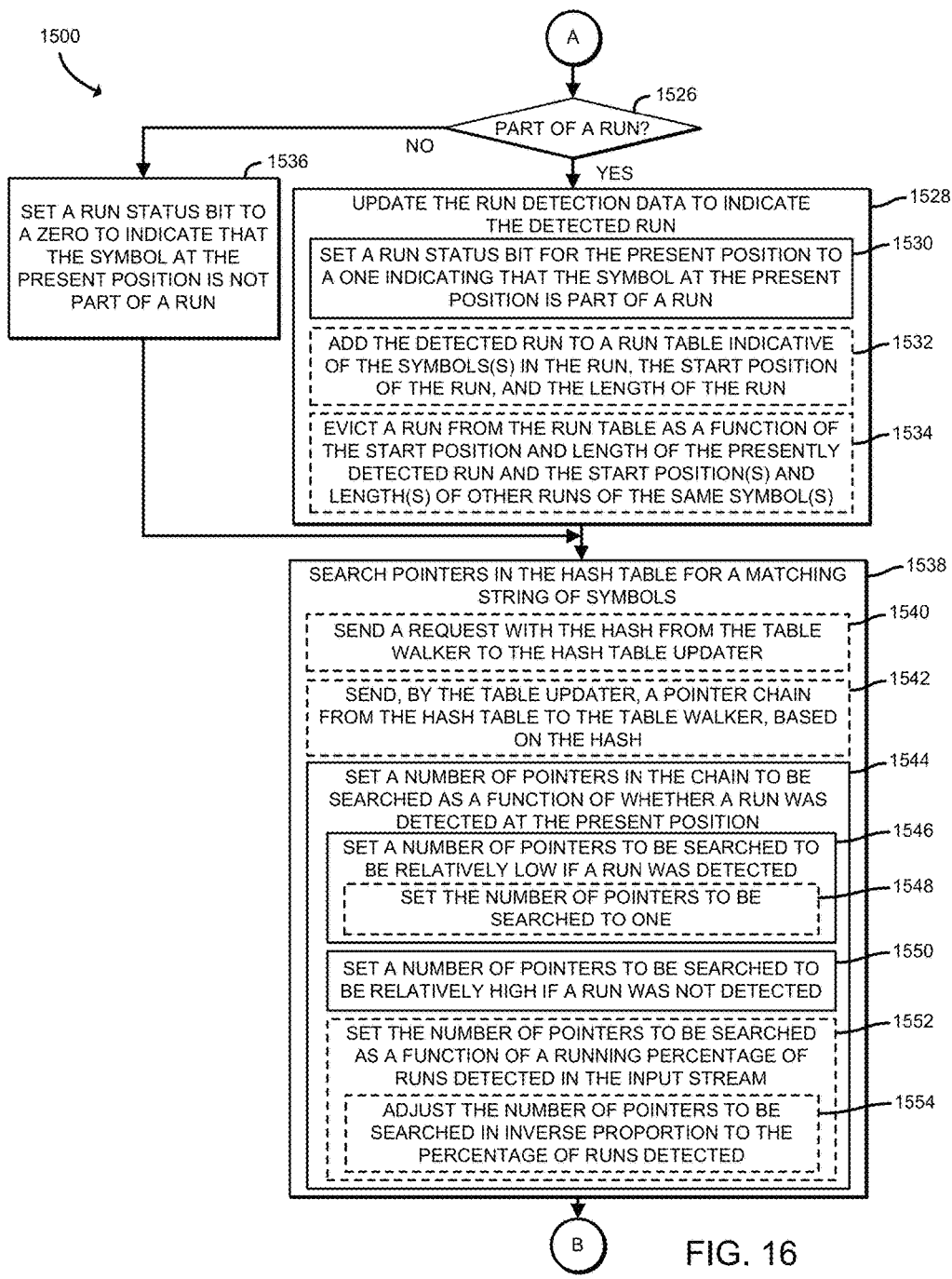

Referring now to FIG. 16, if the present symbol is part of a run, the method 1500 advances to block 1528 in which the managed node 1250 updates the run detection data 1408 to indicate the detection of the run. In doing so, the managed node 1250, in the illustrative embodiment, sets a run status bit (e.g., in the run detection data 1408) associated with the present position to a value (e.g., one) indicating that the symbol at the present position is part of a run, as indicated in block 1530. Additionally, the managed node 1250 may add the detected run to a run table (e.g., also in the run detection data 1408) indicative of the symbols repeated in the run, the start position of the run, and the length of the run (e.g., number of positions), as indicated in block 1532. In connection with adding a detected run to a run table, the managed node 1250 may evict a pre-existing run from the run table as a function of the start position and length of the presently detected run (e.g., the run associated with the present position) and the start position(s) and length(s) of other runs of the same symbols, as indicated in block 1534. In the illustrative embodiment, the managed node 1250 may evict a run that starts and ends at positions that exceed a predefined threshold (e.g., more than 3000 positions earlier that the starting position of the present run). Referring back to block 1526, if the managed node 1250 instead determines that the symbol at the present position is not part of a run, the method 1500 advances to block 1536 in which the managed node 1250 sets a run status bit (e.g., in the run detection data 1408) to a value (e.g., zero) indicating that the symbol at the present position is not part of a run.

In block 1538, the managed node 1250 searches pointers in the hash table for a matching string of symbols (e.g., a string occurring earlier in the input data 1402) with the same sequence of symbols as a string starting at the present position. In doing so, the managed node 1250 may send a request with the hash of the present symbol and a predefined number of subsequent symbols (e.g., the hash produced in block 1512) from the table walker 1450 to the hash table updater 1440, as indicated in block 1540. The managed node 1250 may additionally send, with the hash table updater 1440, a pointer chain from the hash table (e.g., the hash table data 1404) to the table walker 1450, based on the hash (e.g., by looking up the pointer chain associated with the hash), as indicated in block 1542. In block 1544, the managed node 1250 sets, as a function of whether a run was detected at the present position, a number of pointers in the chain to be searched (e.g., checked for a matching string). In doing so, the managed node 1250 in the illustrative embodiment, sets the number of pointers to be searched to be relatively low if a run was detected (e.g., if the run status bit for the present location in the run detection data 1408 is equal to one), as indicated in block 1546. In setting the number of pointers to be relatively low, the managed node 1250 may set the number of pointers to one, as indicated in block 1548. As indicated in block 1550, the managed node 1250 sets the number of pointers to be searched to be relatively high (e.g., up to 200 pointers) if a run was not detected (e.g., if the run status bit is zero). In some embodiments, the managed node 1250 sets the number of pointers to be searched as a function of a percentage of runs that the managed node 1250 has detected in the input stream (e.g., in the input data 1402), as indicated in block 1552. In doing so, the managed node 1250 may adjust the number of pointers to be searched in inverse proportion to the percentage of runs detected, as indicated in block 1554. For example, if 300 out of the last 1,000 symbols have been parts of a run (e.g., a running percentage of 30%), the managed node may set the number of pointers to be searched to be relatively low (e.g., 10 pointers) and if subsequently, the percentage drops to 10%, the managed node 1250 may set the number of pointers to be greater (e.g., 100). Subsequently, the method 1500 advances to block 1556 of FIG. 17, in which the managed node 1250 compares, for the determined number of pointers, the string at each pointer to a string starting at the present position in the input stream.

Figure 17:
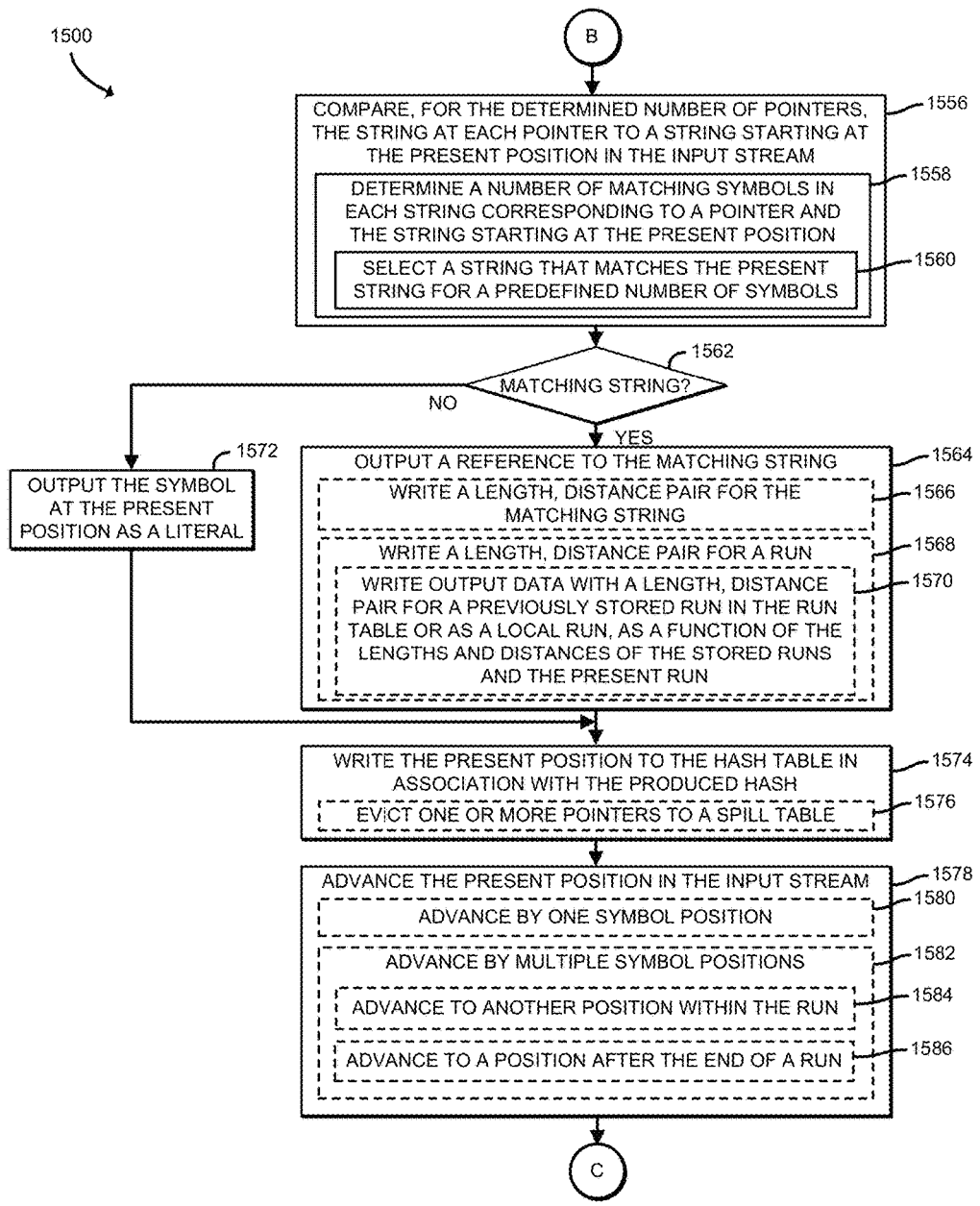

Referring now to FIG. 17, in comparing the string at each pointer to the string starting at the present position of the input stream, the managed node 1250 may determine the number of symbols that match between the string at the present position and each string referenced by one of the pointers, as indicated in block 1558. In doing so, the managed node 1250, in the illustrative embodiment selects a string that satisfies a predefined length threshold (e.g., is the longest matching string found, or that is at least a certain number of symbols long), as indicated in block 1560. In block 1562, the managed node 1250 determines the subsequent actions to perform as a function of whether a matching string was found.

If a matching string was found, the method 1500 advances to block 1564, in which the managed node 1250 outputs a reference to the matching string (e.g., the selected string). In doing so, the managed node 1250, in the illustrative embodiment, writes a length and distance pair (e.g., a number indicative of the length of the string, and a number indicative of the number of positions backwards in the input stream from the present position, where the matching string begins), as indicated in block 1566. As described above, a run is a type of a string. As such, in outputting a reference to the matching string, the managed node 1250 may output a length and distance pair for a matching run, as indicated in block 1568. In some embodiments, and as indicated in block 1570, in outputting the length and distance pair for a run, the managed node 1260 may selectively output a length and distance pair for a previously stored run in the run table (e.g., in the run detection data 1408) or output a length and distance pair for a "local" run (e.g., a distance of one, to reference a position just one position earlier than the present symbol, and a length indicative of the length of the present run). In doing so, the managed node 1250 may select the length and distance pair that requires the least amount of data to encode in the compressed output data 1410 (e.g., a distance of 1 requires fewer bytes to encode than a distance of 1,000). Referring back to block 1562, if the managed node 1250 instead determined that there was no matching string, the method 1500 advances to block 1572, in which the managed node 1250 outputs the symbol at the present position as a literal value (e.g., the actual value of the symbol, such as 0x41 for "A"), rather than a length and distance pair to a matching string.

In block 1574, the managed node 1250 writes the present position to the hash table (e.g., the hash table data 1404) in association with the produced hash (e.g., the hash produced in block 1512). The managed node 1250, in the illustrative embodiment, writes the present position to the first entry in the hash table, and shifts any pre-existing pointers associated with the hash to subsequent positions. Additionally, and as indicated in block 1576, the managed node 1250 may evict one or more pointers associated with the hash to a spill table (e.g., the spill table data 1406) if the present number of pointers associated with the hash in the hash table data 1404 satisfies a predefined threshold (e.g., if the hash table data 1404 already includes 20 pointers associated with the hash).

Subsequently, the method 1500 advances to block 1578, in which the managed node 1250 advances the present position in the input stream (e.g., the input data 1402). In doing so, the managed node 1250 may advance by one symbol position (e.g., if the managed node 1250 output a literal to the compressed output data 1410 for the present position), as indicated in block 1580. Alternatively, the managed node 1250 may advance the present position by multiple positions, as indicated in block 1582. In doing so, the managed node 1250 may advance to another position in a detected run, skipping a predefined number of positions in the process, as indicated in block 1584. As indicated in block 1586, the managed node 1250 may advance to a position after the end of a detected run. Subsequently, the method 1500 loops back to block 1512, in which the managed node 1250 produces a hash of the symbol at the new present position and a predefined number of subsequent symbols.

It should be appreciated that, in other embodiments, the operations described above may be performed in a different order. For example, in some embodiments, the managed node 1250 may determine whether the symbol at the present position is part a run (e.g., block 1516) prior to producing a hash for the present symbol and the predefined number of subsequent symbols.

Figure 18:
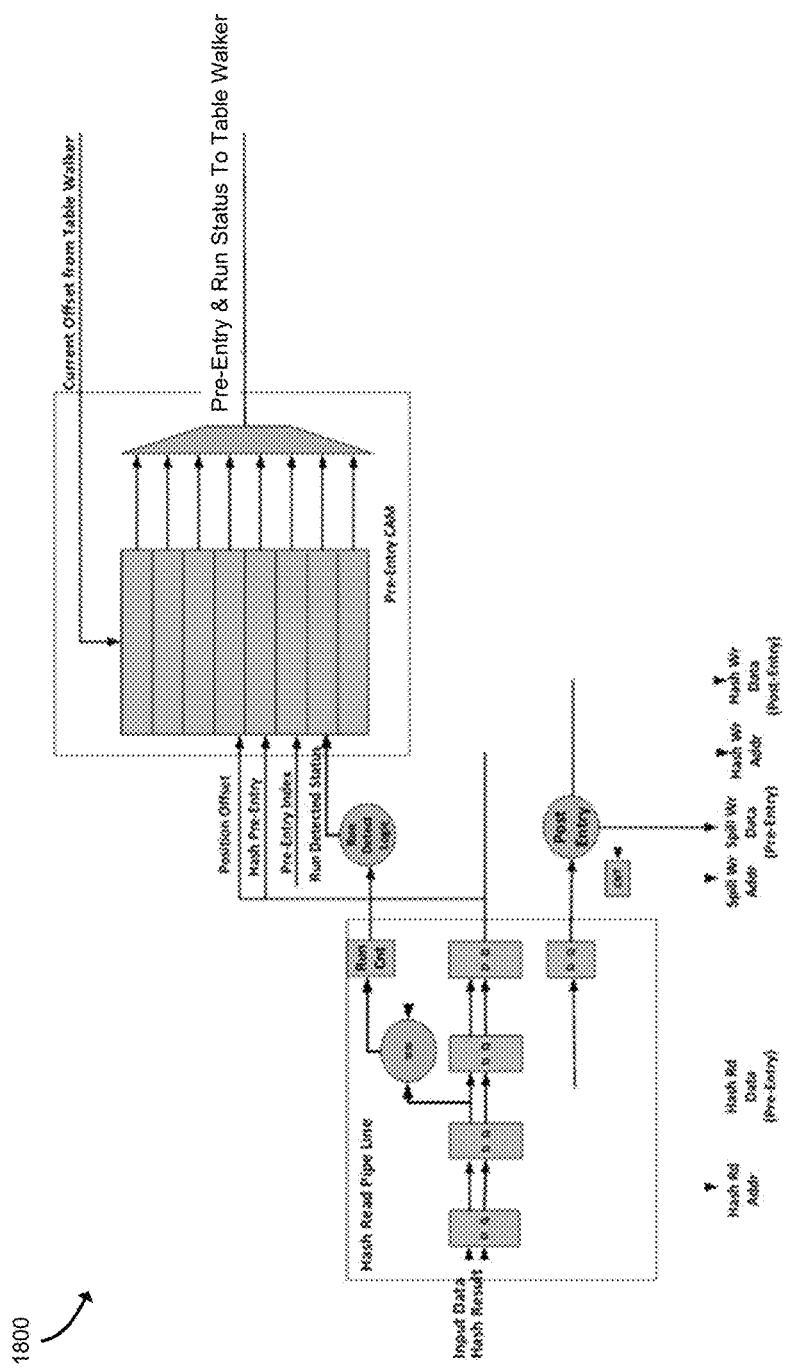
FIG. 18 is a simplified block diagram of an example architecture that may be included in a managed node of FIGS. 12 and 13 to efficiently compress data with run detection.

Referring now to FIG. 18, in an example architecture 1800, several logic units combine to create a compression engine with run detection. For each byte position of an input stream (e.g., an input file), the managed node 1250, using the architecture 1800, performs an "N" byte hash of the input stream and produces a hash result. The number of bytes "N" used in the hash function may be software configured as a minimum length. Using the hash result as an index into the hash table memory, the managed node 1250 performs a lookup or read of that hash table entry. An example has table entry 1900 is shown in FIG. 19. The table updater performs the updates to the hash table entries for each byte position in the input stream. In the illustrative embodiment, the hash table data structure contains 20 offset pointers into a history buffer, a spill table index, and a spill valid bit to indicate that the hash table entry 1900 has overflowed or spilled. In the illustrative embodiment, the state of the hash table entry prior to the update is the hash table pre-entry and the state of the hash table entry following the update is defined as the hash table post entry.

Initially, all pointers of all hash table entries are reset to a null or an invalid state and the spill valid bit is reset to 0. For each update to a hash table entry, the pointers from pre-entry are shifted one position and the new byte position is used as the pointer 0 value for the post entry. In the case where there is no more room to add a new pointer to the hash table entry, 20 pointers in this example, the hash table pre-entry is written to the spill table memory. When an update results in a write to the spill table memory, then pointer 0 of the post entry is written with the value of the new byte position, all other offset pointers of the post entry are written to a null or invalid state, and a spill valid bit is set to 1. An example spill table entry 2000 is shown in FIG. 20. The location into the spill table memory where the new spill table entry 2000 was written is saved as the spill index field of the hash table post entry.

As described above, in addition to creating the hash and spill tables, the table updater contains the logic to detect a run of literals which have the same value. The logic detects a run of literals by comparing the data value at each byte offset of the input stream to the data values for the next "R" bytes of the input stream. The value of R is a configurable minimum number of consecutive bytes that need to be matching for the string of literals to be considered a run by the run detection logic. If the string of matching bytes is greater than or equal to the configured value, then all matching bytes are considered part of the run. For the bytes that make up the run, a status bit called "run detected" is set for each byte position. For literals that are not part of the run, the value of the "run detected" status bit is 0 for those byte positions in the input stream.

Figure 21:
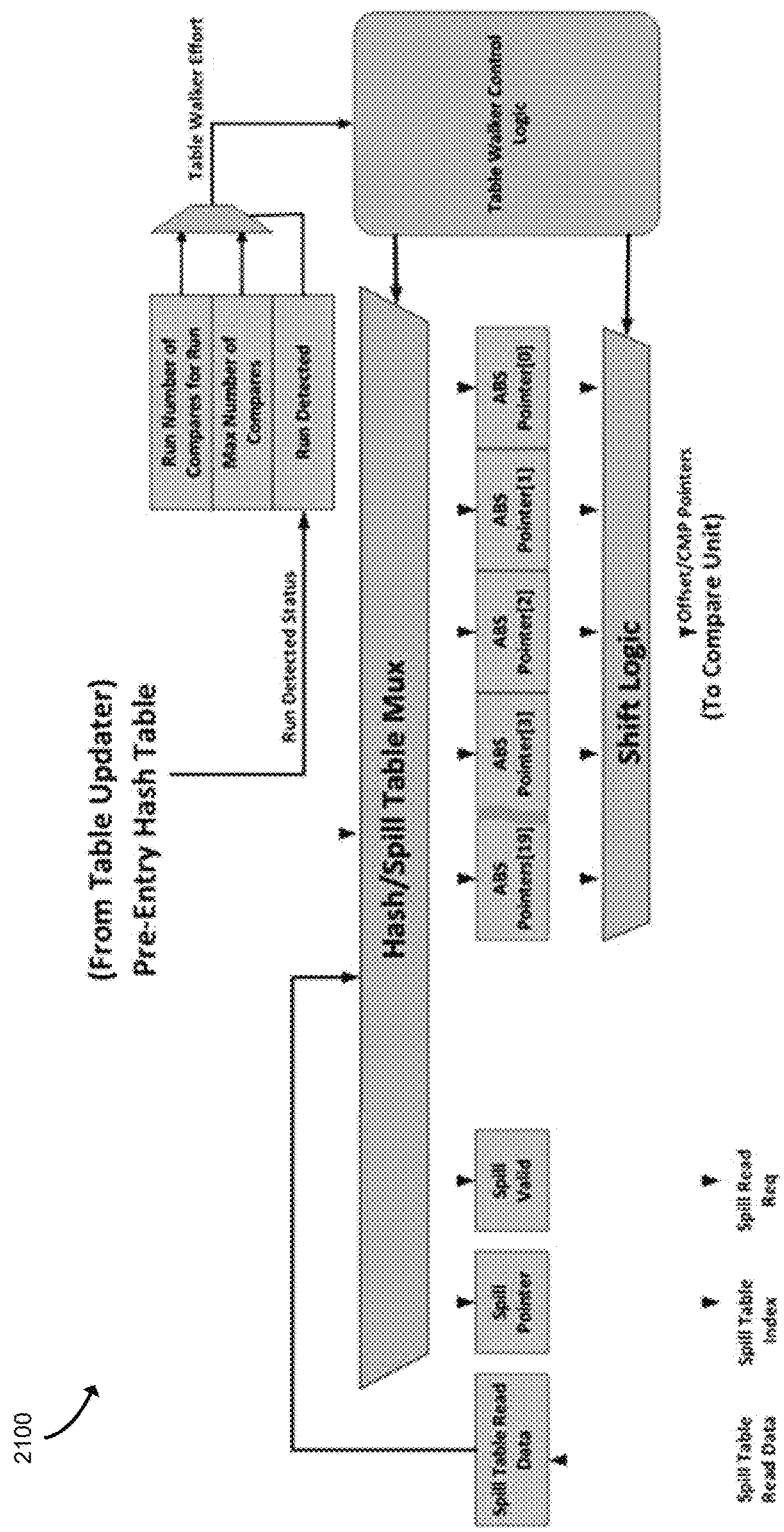
FIG. 21 is another simplified block diagram of an example architecture that may be included in a managed node of FIGS. 12 and 13 to efficiently compress data with run detection.

Referring now to FIG. 21, in an example architecture 2100, the table walker performs "walking" of the hash chains for a selected byte position of the input stream. The byte position of the input stream that the table walker is processing is referred to as the current offset. The table walker sends a request for a hash chain to the table updater for the current offset being processed. The table updater returns to the table walker the hash table pre-entry and the run status bit for the current offset. The effort that the table walker uses for different compression levels is specified by a configuration register indicating a maximum number of pointers to send to the compare unit. For a LZIB level 1 compression setting, the value of this register may be set to 1 and for a higher compression level, such as ZLIB level 9, this register may have a value of 200.

When configured for high compression levels, the table walker may send up to 200 pointers to the compare unit. While the table walker is processing a hash table pre-entry, it fetches or reads a spill table entry from the spill table memory if the spill valid bit is set to 1. The index into the spill table memory is specified in the spill index field of the pre-entry. Once the table walker finishes processing all pointers of the pre-entry, it advances to processing the spill table entry. A spill table entry can also have a spill valid bit set and a spill index pointer to another spill table. Therefore, even though each entry only contains 20 pointers, there may be many entries that make up a hash chain and the hash chain may be hundreds of pointers in length. The table walker continues walking the hash chain until one of several things occurs: i) the table walker detects a position in the entry which contains a null pointer and the spill valid bit is 0, ii) the compare unit sends an indication to the table walker that it has found a "good enough" match for the current offset being processed, iii) the table walker has met a configurable maximum number of pointers to process in a hash chain, or iv) the table walker detects an error in a spill table. Once the table walker detects one of the above conditions, it will advance to processing the hash table pre-entry for the next byte position of the input stream. Regardless of the effort level settings, when the "run detected" status for a byte position is set to 1, the table walker will reduce the number of pointers it sends to the compare unit to a predefined minimum value, which results in the maximum performance gain. Once the table walker has sent the pointers to the compare unit, it will advance to processing the hash table pre-entry for the next byte position of the input stream.

EXAMPLES

Illustrative examples of the technologies disclosed herein are provided below. An embodiment of the technologies may include any one or more, and any combination of, the examples described below.

Example 1 includes a compute device comprising one or more processors; and a memory having stored therein a plurality of instructions that, when executed by the one or more processors, cause the compute device to produce a hash as a function of a symbol at a present position in an input stream and a predefined number of symbols after the present position in the input stream, wherein the symbol is indicative of a start of a string of symbols in the input stream; determine whether the symbol at the present position is part of a run, wherein a run defines a string of one or more repeated symbols in the input stream; obtain, from a hash table, a chain of pointers to previous positions in the input stream associated with the hash; determine, as a function of whether the symbol is part of a run and to identify a matched string, a number of strings referenced by the chain of pointers to compare to the string associated with the present position in the input stream; and output, in response to an identification of a matched string, a reference to the matched string in a set of compressed output data.

Example 2 includes the subject matter of Example 1, and wherein to determine whether the symbol at the present position is part of a run comprises to compare the symbol at the present position to a predefined number of other contiguous symbols in the input stream; and determine whether the symbol at the present position is part of a string of one or more contiguous repeated symbols.

Example 3 includes the subject matter of any of Examples 1 and 2, and wherein the plurality of instructions, when executed, further cause the compute device to set, in response to a determination that the symbol at the present position is part of a run, a run status bit associated with the present position in the input stream to a value indicative that the symbol is part of a run.

Example 4 includes the subject matter of any of Examples 1-3, and wherein the plurality of instructions, when executed, further cause the compute device to set, in response to a determination that the symbol at the present position is not part of a run, a run status bit associated with the present position in the input stream to a value indicative that that the symbol is not part of a run.

Example 5 includes the subject matter of any of Examples 1-4, and wherein to determine whether the symbol at the present position is part of a run comprises to compare the symbol at the present position to a predefined number of other contiguous symbols in the input stream; and determine whether the symbol at the present position is part of a repeated sequence of two or more different symbols.

Example 6 includes the subject matter of any of Examples 1-5, and wherein to determine, as a function of whether the symbol is part of a run, a number of strings referenced by the chain of pointers to compare to the string associated with the present position comprises to determine, in response to a determination that the symbol is part of a run, to compare one string referenced by the chain of pointers to the string associated with the present position.

Example 7 includes the subject matter of any of Examples 1-6, and wherein to determine, as a function of whether the symbol is part of a run, a number of strings referenced by the chain of pointers to compare to the string associated with the present position comprises to determine, in response to a determination that the symbol is not part of a run, to compare more than one string referenced by the chain of pointers to the string associated with the present position.

Example 8 includes the subject matter of any of Examples 1-7, and wherein the plurality of instructions, when executed, further cause the compute device to add, in response to a determination that the symbol at the present position is part of a run, the symbols in the run, a start position of the run, and a length of the run to a run table.

Example 9 includes the subject matter of any of Examples 1-8, and wherein the plurality of instructions, when executed, further cause the compute device to evict an entry from the run table as a function of the start position and length of the run associated with the symbol at the present position and the start position and length of another run indicated in the run table.

Example 10 includes the subject matter of any of Examples 1-9, and wherein to output a reference to a matched string comprises to determine whether to output, as a function of the lengths and positions of one or more stored runs and the run at the present position, whether to output a reference to one of the previously stored runs or a reference to a local run.

Example 11 includes the subject matter of any of Examples 1-10, and wherein to determine the number of strings referenced by the chain of pointers to compare comprises to determine the number of strings to compare further as a function of a percentage of runs detected in the input stream.

Example 12 includes the subject matter of any of Examples 1-11, and wherein to determine the number of strings to compare comprises to adjust the number of strings in inverse proportion to a change in the percentage of runs detected in the input stream.

Example 13 includes the subject matter of any of Examples 1-12, and wherein the plurality of instructions, when executed, further cause the compute device to output, in response to a determination that a matched string has not been identified, the symbol to the set of compressed output data.

Example 14 includes a method for compressing data with run detection, the method comprising producing, by a compute device, a hash as a function of a symbol at a present position in an input stream and a predefined number of symbols after the present position in the input stream, wherein the symbol is indicative of a start of a string of symbols in the input stream; determining, by the compute device, whether the symbol at the present position is part of a run, wherein a run defines a string of one or more repeated symbols in the input stream; obtaining, by the compute device and from a hash table, a chain of pointers to previous positions in the input stream associated with the hash; determining, by the compute device and as a function of whether the symbol is part of a run and to identify a matched string, a number of strings referenced by the chain of pointers to compare to the string associated with the present position in the input stream; and outputting, by the compute device and in response to an identification of a matched string, a reference to the matched string in a set of compressed output data.

Example 15 includes the subject matter of Example 14, and wherein determining whether the symbol at the present position is part of a run comprises comparing the symbol at the present position to a predefined number of other contiguous symbols in the input stream; and determining whether the symbol at the present position is part of a string of one or more contiguous repeated symbols.

Example 16 includes the subject matter of any of Examples 14 and 15, and further including setting, by the compute device and in response to a determination that the symbol at the present position is part of a run, a run status bit associated with the present position in the input stream to indicate that the symbol is part of a run.

Example 17 includes the subject matter of any of Examples 14-16, and further including setting, by the compute device and in response to a determination that the symbol at the present position is not part of a run, a run status bit associated with the present position in the input stream to indicate that the symbol is not part of a run.

Example 18 includes the subject matter of any of Examples 14-17, and wherein determining whether the symbol at the present position is part of a run comprises comparing the symbol at the present position to a predefined number of other contiguous symbols in the input stream; and determining whether the symbol at the present position is part of a repeated sequence of two or more different symbols.

Example 19 includes the subject matter of any of Examples 14-18, and wherein determining, as a function of whether the symbol is part of a run, a number of strings referenced by the chain of pointers to compare to the string associated with the present position comprises determining, in response to a determination that the symbol is part of a run, to compare one string referenced by the chain of pointers to the string associated with the present position.

Example 20 includes the subject matter of any of Examples 14-19, and wherein determining, as a function of whether the symbol is part of a run, a number of strings referenced by the chain of pointers to compare to the string associated with the present position comprises determining, in response to a determination that the symbol is not part of a run, to compare more than one string referenced by the chain of pointers to the string associated with the present position.

Example 21 includes the subject matter of any of Examples 14-20, and further including adding, in response to a determination that the symbol at the present position is part of a run, the symbols in the run, a start position of the run, and a length of the run to a run table.

Example 22 includes the subject matter of any of Examples 14-21, and further including evicting, by the compute device, an entry from the run table as a function of the start position and length of the run associated with the symbol at the present position and the start position and length of another run indicated in the run table.

Example 23 includes the subject matter of any of Examples 14-22, and wherein outputting a reference to a matched string comprises determining, as a function of the lengths and positions of one or more stored runs and the run at the present position, whether to output a reference to one of the previously stored runs or a reference to a local run.

Example 24 includes the subject matter of any of Examples 14-23, and wherein determining the number of strings referenced by the chain of pointers to compare comprises determining the number of strings to compare additionally as a function of a percentage of runs detected in the input stream.

Example 25 includes the subject matter of any of Examples 14-24, and wherein determining the number of strings to compare comprises adjusting the number of strings in inverse proportion to a change in the percentage of runs detected in the input stream.

Example 26 includes the subject matter of any of Examples 14-25, and further including outputting, by the compute device and in response to a determination that a matched string has not been identified, the symbol to the set of compressed output data.

Example 27 includes one or more machine-readable storage media comprising a plurality of instructions stored thereon that, in response to being executed, cause a compute device to perform the method of any of Examples 14-26.

Example 28 includes a compute device for compressing data with run detection, the compute device comprising one or more processors; one or more memory devices having stored therein a plurality of instructions that, when executed by the one or more processors, cause the compute device to perform the method of any of Examples 14-26.

Example 29 includes a compute device comprising means for producing a hash as a function of a symbol at a present position in an input stream and a predefined number of symbols after the present position in the input stream, wherein the symbol is indicative of a start of a string of symbols in the input stream; means for determining whether the symbol at the present position is part of a run, wherein a run defines a string of one or more repeated symbols in the input stream; means for obtaining, from a hash table, a chain of pointers to previous positions in the input stream associated with the hash; means for determining, as a function of whether the symbol is part of a run and to identify a matched string, a number of strings referenced by the chain of pointers to compare to the string associated with the present position in the input stream; and means for outputting, in response to an identification of a matched string, a reference to the matched string in a set of compressed output data.

Example 30 includes the subject matter of Example 29, and wherein the means for determining whether the symbol at the present position is part of a run comprises means for comparing the symbol at the present position to a predefined number of other contiguous symbols in the input stream; and means for determining whether the symbol at the present position is part of a string of one or more contiguous repeated symbols.

Example 31 includes the subject matter of any of Examples 29 and 30, and further including means for setting, in response to a determination that the symbol at the present position is part of a run, a run status bit associated with the present position in the input stream to indicate that the symbol is part of a run.

Example 32 includes the subject matter of any of Examples 29-31, and further including means for setting, in response to a determination that the symbol at the present position is not part of a run, a run status bit associated with the present position in the input stream to indicate that the symbol is not part of a run.

Example 33 includes the subject matter of any of Examples 29-32, and wherein the means for determining whether the symbol at the present position is part of a run comprises means for comparing the symbol at the present position to a predefined number of other contiguous symbols in the input stream; and means for determining whether the symbol at the present position is part of a repeated sequence of two or more different symbols.

Example 34 includes the subject matter of any of Examples 29-33, and wherein the means for determining, as a function of whether the symbol is part of a run, a number of strings referenced by the chain of pointers to compare to the string associated with the present position comprises means for determining, in response to a determination that the symbol is part of a run, to compare one string referenced by the chain of pointers to the string associated with the present position.

Example 35 includes the subject matter of any of Examples 29-34, and wherein the means for determining, as a function of whether the symbol is part of a run, a number of strings referenced by the chain of pointers to compare to the string associated with the present position comprises means for determining, in response to a determination that the symbol is not part of a run, to compare more than one string referenced by the chain of pointers to the string associated with the present position.

Example 36 includes the subject matter of any of Examples 29-35, and further including means for adding, in response to a determination that the symbol at the present position is part of a run, the symbols in the run, a start position of the run, and a length of the run to a run table.

Example 37 includes the subject matter of any of Examples 29-36, and further including means for evicting an entry from the run table as a function of the start position and length of the run associated with the symbol at the present position and the start position and length of another run indicated in the run table.

Example 38 includes the subject matter of any of Examples 29-37, and wherein the means for outputting a reference to a matched string comprises means for determining, as a function of the lengths and positions of one or more stored runs and the run at the present position, whether to output a reference to one of the previously stored runs or a reference to a local run.

Example 39 includes the subject matter of any of Examples 29-38, and wherein the means for determining the number of strings referenced by the chain of pointers to compare comprises means for determining the number of strings to compare additionally as a function of a percentage of runs detected in the input stream.

Example 40 includes the subject matter of any of Examples 29-39, and wherein the means for determining the number of strings to compare comprises means for adjusting the number of strings in inverse proportion to a change in the percentage of runs detected in the input stream.

Example 41 includes the subject matter of any of Examples 29-40, and further including means for outputting, in response to a determination that a matched string has not been identified, the symbol to the set of compressed output data.

The invention claimed is:

1. A compute device comprising:
   one or more processors; and
   a memory having stored therein a plurality of instructions that, when executed by the one or more processors, cause the compute device to:
      produce a hash as a function of a symbol at a present position in an input stream and a predefined number of symbols after the present position in the input stream, wherein the symbol is indicative of a start of a string of symbols in the input stream;
      determine whether the symbol at the present position is part of a run, wherein a run defines a string of one or more repeated symbols in the input stream;
      obtain, from a hash table, a chain of pointers to previous positions in the input stream associated with the hash;
      determine, as a function of whether the symbol is part of a run and to identify a matched string, a number of strings referenced by the chain of pointers to compare to the string associated with the present position in the input stream; and
      output, in response to an identification of a matched string, a reference to the matched string in a set of compressed output data.

2. The compute device of claim 1, wherein to determine whether the symbol at the present position is part of a run comprises to:
   compare the symbol at the present position to a predefined number of other contiguous symbols in the input stream; and
   determine whether the symbol at the present position is part of a string of one or more contiguous repeated symbols.

3. The compute device of claim 1, wherein the plurality of instructions, when executed, further cause the compute device to set, in response to a determination that the symbol at the present position is part of a run, a run status bit associated with the present position in the input stream to a value indicative that the symbol is part of a run.

4. The compute device of claim 1, wherein the plurality of instructions, when executed, further cause the compute device to set, in response to a determination that the symbol at the present position is not part of a run, a run status bit associated with the present position in the input stream to a value indicative that that the symbol is not part of a run.

5. The compute device of claim 1, wherein to determine whether the symbol at the present position is part of a run comprises to:
compare the symbol at the present position to a predefined number of other contiguous symbols in the input stream; and
determine whether the symbol at the present position is part of a repeated sequence of two or more different symbols.

6. The compute device of claim 1, wherein to determine, as a function of whether the symbol is part of a run, a number of strings referenced by the chain of pointers to compare to the string associated with the present position comprises to determine, in response to a determination that the symbol is part of a run, to compare one string referenced by the chain of pointers to the string associated with the present position.

7. The compute device of claim 1, wherein to determine, as a function of whether the symbol is part of a run, a number of strings referenced by the chain of pointers to compare to the string associated with the present position comprises to determine, in response to a determination that the symbol is not part of a run, to compare more than one string referenced by the chain of pointers to the string associated with the present position.

8. The compute device of claim 1, wherein the plurality of instructions, when executed, further cause the compute device to add, in response to a determination that the symbol at the present position is part of a run, the symbols in the run, a start position of the run, and a length of the run to a run table.

9. The compute device of claim 8, wherein the plurality of instructions, when executed, further cause the compute device to evict an entry from the run table as a function of the start position and length of the run associated with the symbol at the present position and the start position and length of another run indicated in the run table.

10. The compute device of claim 1, wherein to output a reference to a matched string comprises to determine whether to output, as a function of the lengths and positions of one or more stored runs and the run at the present position, whether to output a reference to one of the previously stored runs or a reference to a local run.

11. The compute device of claim 1, wherein to determine the number of strings referenced by the chain of pointers to compare comprises to determine the number of strings to compare further as a function of a percentage of runs detected in the input stream.

12. The compute device of claim 11, wherein to determine the number of strings to compare comprises to adjust the number of strings in inverse proportion to a change in the percentage of runs detected in the input stream.

13. One or more non-transitory machine-readable storage media comprising a plurality of instructions stored thereon that, when executed by a compute device cause the compute device to:
produce a hash as a function of a symbol at a present position in an input stream and a predefined number of symbols after the present position in the input stream, wherein the symbol is indicative of a start of a string of symbols in the input stream;
determine whether the symbol at the present position is part of a run, wherein a run defines a string of one or more repeated symbols in the input stream;
obtain, from a hash table, a chain of pointers to previous positions in the input stream associated with the hash;
determine, as a function of whether the symbol is part of a run and to identify a matched string, a number of strings referenced by the chain of pointers to compare to the string associated with the present position in the input stream; and
output, in response to an identification of a matched string, a reference to the matched string in a set of compressed output data.

14. The one or more non-transitory machine-readable storage media of claim 13, wherein to determine whether the symbol at the present position is part of a run comprises to:
compare the symbol at the present position to a predefined number of other contiguous symbols in the input stream; and
determine whether the symbol at the present position is part of a string of one or more contiguous repeated symbols.

15. The one or more non-transitory machine-readable storage media of claim 13, wherein the plurality of instructions, when executed, further cause the compute device to set, in response to a determination that the symbol at the present position is part of a run, a run status bit associated with the present position in the input stream to a value indicative that the symbol is part of a run.

16. The one or more non-transitory machine-readable storage media of claim 13, wherein the plurality of instructions, when executed, further cause the compute device to set, in response to a determination that the symbol at the present position is not part of a run, a run status bit associated with the present position in the input stream to a value indicative that that the symbol is not part of a run.

17. The one or more non-transitory machine-readable storage media of claim 13, wherein to determine whether the symbol at the present position is part of a run comprises to:
compare the symbol at the present position to a predefined number of other contiguous symbols in the input stream; and
determine whether the symbol at the present position is part of a repeated sequence of two or more different symbols.

18. The one or more non-transitory machine-readable storage media of claim 13, wherein to determine, as a function of whether the symbol is part of a run, a number of strings referenced by the chain of pointers to compare to the string associated with the present position comprises to determine, in response to a determination that the symbol is part of a run, to compare one string referenced by the chain of pointers to the string associated with the present position.

19. The one or more non-transitory machine-readable storage media of claim 13, wherein to determine, as a function of whether the symbol is part of a run, a number of strings referenced by the chain of pointers to compare to the string associated with the present position comprises to determine, in response to a determination that the symbol is not part of a run, to compare more than one string referenced by the chain of pointers to the string associated with the present position.

20. The one or more non-transitory machine-readable storage media of claim 13, wherein the plurality of instructions, when executed, further cause the compute device to add, in response to a determination that the symbol at the present position is part of a run, the symbols in the run, a start position of the run, and a length of the run to a run table.

21. The one or more non-transitory machine-readable storage media of claim 20, wherein the plurality of instructions, when executed, further cause the compute device to evict an entry from the run table as a function of the start position and length of the run associated with the symbol at the present position and the start position and length of another run indicated in the run table.

22. The one or more non-transitory machine-readable storage media of claim 13, wherein to output a reference to a matched string comprises to determine whether to output, as a function of the lengths and positions of one or more stored runs and the run at the present position, whether to output a reference to one of the previously stored runs or a reference to a local run.

23. The one or more non-transitory machine-readable storage media of claim 13, wherein to determine the number of strings referenced by the chain of pointers to compare comprises to determine the number of strings to compare further as a function of a percentage of runs detected in the input stream.

24. A method for compressing data with run detection, the method comprising:
   producing, by a compute device, a hash as a function of a symbol at a present position in an input stream and a predefined number of symbols after the present position in the input stream, wherein the symbol is indicative of a start of a string of symbols in the input stream;
   determining, by the compute device, whether the symbol at the present position is part of a run, wherein a run defines a string of one or more repeated symbols in the input stream;
   obtaining, by the compute device and from a hash table, a chain of pointers to previous positions in the input stream associated with the hash;
   determining, by the compute device and as a function of whether the symbol is part of a run and to identify a matched string, a number of strings referenced by the chain of pointers to compare to the string associated with the present position in the input stream; and
   outputting, by the compute device and in response to an identification of a matched string, a reference to the matched string in a set of compressed output data.

25. The method of claim 24, wherein determining whether the symbol at the present position is part of a run comprises:
   comparing the symbol at the present position to a predefined number of other contiguous symbols in the input stream; and
   determining whether the symbol at the present position is part of a string of one or more contiguous repeated symbols.

* * * * *